(12) United States Patent
Fama et al.

(10) Patent No.: US 11,367,026 B2
(45) Date of Patent: *Jun. 21, 2022

(54) SYSTEMS AND METHODS FOR AUTOMATIC SCHEDULING OF A WORKFORCE

(71) Applicant: Verint Americas Inc., Alpharetta, GA (US)

(72) Inventors: Jason Fama, Redwood, CA (US); Michael Zeoli, Sunderland, MA (US); Edward Hamilton, San Jose, CA (US)

(73) Assignee: Verint Americas Inc., Alpharetta, GA (US)

( * ) Notice: Subject to any disclaimer, the term of this patent is extended or adjusted under 35 U.S.C. 154(b) by 242 days.

This patent is subject to a terminal disclaimer.

(21) Appl. No.: 16/173,132

(22) Filed: Oct. 29, 2018

(65) Prior Publication Data

US 2019/0130329 A1 May 2, 2019
US 2021/0398040 A9 Dec. 23, 2021

Related U.S. Application Data

(63) Continuation of application No. 12/916,678, filed on Nov. 1, 2010, now Pat. No. 10,115,065.

(60) Provisional application No. 61/256,579, filed on Oct. 30, 2009, provisional application No. 61/256,586, (Continued)

(51) Int. Cl.
*G06Q 10/06* (2012.01)

(52) U.S. Cl.
CPC ......... *G06Q 10/06311* (2013.01); *G06Q 10/063116* (2013.01); *G06Q 10/063* (2013.01); *G06Q 10/0631* (2013.01)

(58) Field of Classification Search
None
See application file for complete search history.

(56) References Cited

U.S. PATENT DOCUMENTS

| | | |
|---|---|---|
| 3,594,919 A | 7/1971 | De Bell et al. |
| 3,705,271 A | 12/1972 | De Bell et al. |
| 4,510,351 A | 4/1985 | Costello et al. |

(Continued)

FOREIGN PATENT DOCUMENTS

| | | |
|---|---|---|
| CA | 2262044 | 10/1999 |
| EP | 0453128 | 10/1991 |

(Continued)

OTHER PUBLICATIONS

Abstract, net.working: "An Online Webliography," Technical Training, 1998, pp. 4-5.

(Continued)

*Primary Examiner* — Stephanie Z Delich
(74) *Attorney, Agent, or Firm* — Christopher M. Scherer; DeWitt LLP

(57) ABSTRACT

Systems and methods are disclosed for scheduling a workforce. In one embodiment, the method comprises receiving a shift activity template; receiving an association between the shift activity template and at least one worker; and scheduling a plurality of schedulable objects. The scheduling is performed in accordance with a workload forecast and schedule constraints. Each of the schedulable objects is based on the shift activity template. The shift activity template describes a worker activity performed during a shift. The template has range of start times and a variable length for the activity. The activity is associated with a queue.

20 Claims, 13 Drawing Sheets

Related U.S. Application Data filed on Oct. 30, 2009, provisional application No. 61/256,599, filed on Oct. 30, 2009.

(56) References Cited

U.S. PATENT DOCUMENTS

| | | |
|---|---|---|
| 4,684,349 A | 8/1987 | Ferguson et al. |
| 4,694,483 A | 9/1987 | Cheung |
| 4,763,353 A | 8/1988 | Canale et al. |
| 4,815,120 A | 3/1989 | Kosich |
| 4,884,217 A | 11/1989 | Skeirik et al. |
| 4,924,488 A | 5/1990 | Kosich |
| 4,953,159 A | 8/1990 | Hayden et al. |
| 5,016,272 A | 5/1991 | Stubbs et al. |
| 5,101,402 A | 3/1992 | Chiu et al. |
| 5,117,225 A | 5/1992 | Wang |
| 5,210,789 A | 5/1993 | Jeffus et al. |
| 5,239,460 A | 8/1993 | LaRoche |
| 5,241,625 A | 8/1993 | Epard et al. |
| 5,267,865 A | 12/1993 | Lee et al. |
| 5,299,260 A | 3/1994 | Shaio |
| 5,303,170 A | 4/1994 | Valko |
| 5,311,422 A | 5/1994 | Loftin et al. |
| 5,315,711 A | 5/1994 | Barone et al. |
| 5,317,628 A | 5/1994 | Misholi et al. |
| 5,325,292 A | 6/1994 | Crockett |
| 5,347,306 A | 9/1994 | Nitta |
| 5,388,252 A | 2/1995 | Dreste et al. |
| 5,396,371 A | 3/1995 | Henits et al. |
| 5,432,715 A | 7/1995 | Shigematsu et al. |
| 5,465,286 A | 11/1995 | Clare et al. |
| 5,475,625 A | 12/1995 | Glaschick |
| 5,485,569 A | 1/1996 | Goldman et al. |
| 5,491,780 A | 2/1996 | Fyles et al. |
| 5,499,291 A | 3/1996 | Kepley |
| 5,511,165 A | 4/1996 | Brady et al. |
| 5,526,407 A | 6/1996 | Russell et al. |
| 5,535,256 A | 7/1996 | Maloney et al. |
| 5,572,652 A | 11/1996 | Robusto et al. |
| 5,577,112 A | 11/1996 | Cambray et al. |
| 5,590,171 A | 12/1996 | Howe et al. |
| 5,597,312 A | 1/1997 | Bloom et al. |
| 5,619,183 A | 4/1997 | Ziegra et al. |
| 5,696,906 A | 12/1997 | Peters et al. |
| 5,717,879 A | 2/1998 | Moran et al. |
| 5,721,842 A | 2/1998 | Beasley et al. |
| 5,742,670 A | 4/1998 | Bennett |
| 5,748,499 A | 5/1998 | Trueblood |
| 5,778,182 A | 7/1998 | Cathey et al. |
| 5,784,452 A | 7/1998 | Carney |
| 5,790,798 A | 8/1998 | Beckett, II et al. |
| 5,796,952 A | 8/1998 | Davis et al. |
| 5,809,247 A | 9/1998 | Richardson et al. |
| 5,809,250 A | 9/1998 | Kisor |
| 5,825,869 A | 10/1998 | Brooks et al. |
| 5,835,572 A | 11/1998 | Richardson, Jr. et al. |
| 5,862,330 A | 1/1999 | Anjupam et al. |
| 5,864,772 A | 1/1999 | Alvarado et al. |
| 5,884,032 A | 3/1999 | Bateman et al. |
| 5,907,680 A | 5/1999 | Nielsen |
| 5,911,134 A | 6/1999 | Castonguay et al. |
| 5,918,214 A | 6/1999 | Perkowski |
| 5,923,746 A | 7/1999 | Baker et al. |
| 5,933,811 A | 8/1999 | Angles et al. |
| 5,944,791 A | 8/1999 | Scherpbier |
| 5,948,061 A | 9/1999 | Merriman et al |
| 5,958,016 A | 9/1999 | Chang et al. |
| 5,964,836 A | 10/1999 | Rowe et al. |
| 5,970,455 A | 10/1999 | Wilcox et al. |
| 5,978,648 A | 11/1999 | George et al. |
| 5,982,857 A | 11/1999 | Brady |
| 5,987,466 A | 11/1999 | Greer et al. |
| 5,990,852 A | 11/1999 | Szamrej |
| 5,991,373 A | 11/1999 | Pattison et al. |
| 5,991,796 A | 11/1999 | Anupam et al. |
| 6,005,932 A | 12/1999 | Bloom |
| 6,009,429 A | 12/1999 | Greer et al. |
| 6,014,134 A | 1/2000 | Bell et al. |
| 6,014,647 A | 1/2000 | Nizzari et al. |
| 6,018,619 A | 1/2000 | Allard et al. |
| 6,035,332 A | 3/2000 | Ingrassia et al. |
| 6,038,544 A | 3/2000 | Machin et al. |
| 6,039,575 A | 3/2000 | L'Allier et al. |
| 6,044,355 A | 3/2000 | Crockett et al. |
| 6,057,841 A | 5/2000 | Thurlow et al. |
| 6,058,163 A | 5/2000 | Pattison et al. |
| 6,061,798 A | 5/2000 | Coley et al. |
| 6,072,860 A | 6/2000 | Kek et al. |
| 6,076,099 A | 6/2000 | Chen et al. |
| 6,078,894 A | 6/2000 | Clawson et al. |
| 6,091,712 A | 7/2000 | Pope et al. |
| 6,108,711 A | 8/2000 | Beck et al. |
| 6,122,665 A | 9/2000 | Bar et al. |
| 6,122,668 A | 9/2000 | Teng et al. |
| 6,130,668 A | 10/2000 | Stein |
| 6,138,139 A | 10/2000 | Beck et al. |
| 6,144,991 A | 11/2000 | England |
| 6,146,148 A | 11/2000 | Stuppy |
| 6,151,622 A | 11/2000 | Fraenkel et al. |
| 6,154,771 A | 11/2000 | Rangan et al. |
| 6,157,808 A | 12/2000 | Hollingsworth |
| 6,171,109 B1 | 1/2001 | Ohsuga |
| 6,182,094 B1 | 1/2001 | Humpieman et al. |
| 6,195,679 B1 | 2/2001 | Bauersfeld et al. |
| 6,201,948 B1 | 3/2001 | Cook et al. |
| 6,211,451 B1 | 4/2001 | Tohgi et al. |
| 6,225,993 B1 | 5/2001 | Lindblad et al. |
| 6,230,197 B1 | 5/2001 | Beck et al. |
| 6,236,977 B1 | 5/2001 | Verba et al. |
| 6,244,758 B1 | 6/2001 | Solymar et al. |
| 6,278,772 B1 | 8/2001 | Bowater et al. |
| 6,282,548 B1 | 8/2001 | Burner et al. |
| 6,286,030 B1 | 9/2001 | Wenig et al. |
| 6,286,046 B1 | 9/2001 | Bryant |
| 6,288,753 B1 | 9/2001 | DeNicola et al. |
| 6,289,340 B1 | 9/2001 | Purnam et al. |
| 6,301,462 B1 | 10/2001 | Freeman et al. |
| 6,301,573 B1 | 10/2001 | McIlwaine et al. |
| 6,324,282 B1 | 11/2001 | McIlwaine et al. |
| 6,347,374 B1 | 2/2002 | Drake et al. |
| 6,351,467 B1 | 2/2002 | Dillon |
| 6,353,851 B1 | 3/2002 | Anupam et al. |
| 6,360,250 B1 | 3/2002 | Anupam et al. |
| 6,370,574 B1 | 4/2002 | House et al. |
| 6,404,857 B1 | 6/2002 | Blair et al. |
| 6,408,064 B1 | 6/2002 | Federov et al. |
| 6,411,724 B1 | 6/2002 | Vaithilingam et al. |
| 6,411,989 B1 | 6/2002 | Anupam et al. |
| 6,415,259 B1 | 7/2002 | Wolfinger et al. |
| 6,418,471 B1 | 7/2002 | Shelton et al. |
| 6,459,787 B2 | 10/2002 | McIlwaine et al. |
| 6,487,195 B1 | 11/2002 | Choung et al. |
| 6,493,758 B1 | 12/2002 | McLain |
| 6,502,131 B1 | 12/2002 | Vaid et al. |
| 6,510,220 B1 | 1/2003 | Beckett, II et al. |
| 6,535,909 B1 | 3/2003 | Rust |
| 6,542,602 B1 | 4/2003 | Elazar |
| 6,546,405 B2 | 4/2003 | Gupta et al. |
| 6,560,328 B1 | 5/2003 | Bondarenko et al. |
| 6,583,806 B2 | 6/2003 | Ludwig et al. |
| 6,603,854 B1 | 8/2003 | Judkins et al. |
| 6,604,093 B1 | 8/2003 | Etzion et al. |
| 6,606,657 B1 | 8/2003 | Zilberstein et al. |
| 6,628,777 B1 | 9/2003 | McIllwaine et al. |
| 6,665,644 B1 | 12/2003 | Kanevsky et al. |
| 6,674,447 B1 | 1/2004 | Chiang et al. |
| 6,683,633 B2 | 1/2004 | Holtzblatt et al. |
| 6,697,796 B2 | 2/2004 | Kermani |
| 6,697,858 B1 | 2/2004 | Ezerzer et al. |
| 6,724,887 B1 | 4/2004 | Eilbacher et al. |
| 6,738,456 B2 | 5/2004 | Wrona et al. |
| 6,757,361 B2 | 6/2004 | Blair et al. |
| 6,766,012 B1 | 7/2004 | Crossley |
| 6,772,396 B1 | 8/2004 | Cronin et al. |
| 6,775,377 B2 | 8/2004 | McIlwaine et al. |

(56) References Cited

U.S. PATENT DOCUMENTS

| | | |
|---|---|---|
| 6,792,575 B1 | 9/2004 | Samaniego et al. |
| 6,810,414 B1 | 10/2004 | Brittain |
| 6,820,083 B1 | 11/2004 | Nagy et al. |
| 6,823,384 B1 | 11/2004 | Wilson et al. |
| 6,870,916 B2 | 3/2005 | Henrikson et al. |
| 6,871,229 B2 | 3/2005 | Nisani et al. |
| 6,901,438 B1 | 5/2005 | Davis et al. |
| 6,959,078 B1 | 10/2005 | Eilbacher et al. |
| 6,965,886 B2 | 11/2005 | Govrin et al. |
| 6,970,829 B1 | 11/2005 | Leamon |
| 7,047,297 B2 | 5/2006 | Huntington et al. |
| 7,092,509 B1 | 8/2006 | Mears et al. |
| 7,346,531 B2 | 3/2008 | Jacobs |
| 7,385,479 B1 | 6/2008 | Green et al. |
| 7,581,008 B2 | 8/2009 | Zhang et al. |
| 7,650,293 B2 | 1/2010 | Kiran et al. |
| 8,199,900 B2 | 6/2012 | Barnett |
| 2001/0000962 A1 | 5/2001 | Rajan |
| 2001/0014143 A1 | 8/2001 | Kuhn |
| 2001/0032335 A1 | 10/2001 | Jones |
| 2001/0043697 A1 | 11/2001 | Cox et al. |
| 2002/0019737 A1 | 2/2002 | Stuart et al. |
| 2002/0023157 A1 | 2/2002 | Lo et al. |
| 2002/0038363 A1 | 3/2002 | MacLean |
| 2002/0052948 A1 | 5/2002 | Baudu et al. |
| 2002/0065911 A1 | 5/2002 | Von Klopp et al. |
| 2002/0065912 A1 | 5/2002 | Catchpole et al. |
| 2002/0112048 A1 | 8/2002 | Gruyer et al. |
| 2002/0128925 A1 | 9/2002 | Angeles |
| 2002/0143925 A1 | 10/2002 | Pricer et al. |
| 2002/0165954 A1 | 11/2002 | Eshghi et al. |
| 2003/0055883 A1 | 3/2003 | Wiles et al. |
| 2003/0079020 A1 | 4/2003 | Gourraud et al. |
| 2003/0144900 A1 | 7/2003 | Whitmer |
| 2003/0154240 A1 | 8/2003 | Nygren et al. |
| 2004/0083101 A1 | 4/2004 | Brown et al. |
| 2004/0100507 A1 | 5/2004 | Hayner et al. |
| 2004/0138944 A1 | 7/2004 | Whiteacre et al. |
| 2004/0165717 A1 | 8/2004 | McIlwaine et al. |
| 2004/0193472 A1 | 9/2004 | Ramakrishnan et al. |
| 2004/0193473 A1 | 9/2004 | Robertson et al. |
| 2004/0193972 A1 | 9/2004 | Mitlin et al. |
| 2004/0202308 A1 | 10/2004 | Baggenstoss et al. |
| 2004/0249650 A1 | 12/2004 | Freedman et al. |
| 2004/0267591 A1 | 12/2004 | Hedlund et al. |
| 2004/0267595 A1 | 12/2004 | Woodings et al. |
| 2005/0004828 A1 | 1/2005 | deSilva et al. |
| 2005/0069119 A1 | 3/2005 | Erhart et al. |
| 2005/0108518 A1 | 5/2005 | Pandaya et al. |
| 2005/0114224 A1 | 5/2005 | Hodges et al. |
| 2005/0137925 A1 | 6/2005 | Lakritz |
| 2005/0138560 A1 | 6/2005 | Lee et al. |
| 2005/0240656 A1 | 10/2005 | Blair |
| 2006/0062376 A1 | 3/2006 | Pickford |
| 2006/0239440 A1 | 10/2006 | Shaffer et al. |
| 2006/0256953 A1 | 11/2006 | Pulaski et al. |
| 2007/0050228 A1 | 3/2007 | Beshears |
| 2007/0124363 A1 | 5/2007 | Lurie et al. |
| 2007/0127690 A1 | 6/2007 | Patakula et al. |
| 2007/0179829 A1 | 8/2007 | Laperi et al. |
| 2008/0004934 A1 | 1/2008 | Fama et al. |
| 2009/0083020 A1 | 3/2009 | Benayon et al. |
| 2009/0306984 A1 | 12/2009 | Mark et al. |
| 2017/0124363 A1 | 5/2017 | Rietzler |

FOREIGN PATENT DOCUMENTS

| | | |
|---|---|---|
| EP | 0773687 | 5/1997 |
| EP | 0989720 | 3/2000 |
| GB | 2369263 | 5/2002 |
| WO | 1998/043380 | 11/1998 |
| WO | 2001/006207 | 3/2000 |

OTHER PUBLICATIONS

Adams, D., et al., "Our Turn-of-the-Century Trend Watch," Technical Training, 1998, pp. 46-47.

Aho, Alfred V. et al., "Efficient String Matching: An Aid to Bibliographic Search", Communications of the ACM, Jun. 1975, vol. 18, No. 6, pp. 334-340.

Anderson: Interactive TVs New Approach, The Standard, Oct. 1, 1999.

Ante, "Everything You Ever Wanted to Know About Cryptography Legislation (But Were too Sensible to Ask)", PC World Online, Dec. 14, 1999.

Aspect Call Center Product Specification, "Release 2.0", Aspect Telecommunications Corporation, May 23, 1998, 798.

Barron, T., "The Road to Performance: Three Vignettes," Technical Skills and Training, 1997, pp. 12-14.

Bauer, A., "Just-in-Time Desktop Training is Quick, Easy, and Affordable," Technology Tools, Technical Training, 1998, pp. 8-11.

Beck, J., et al., "Applications of AI in Education," AMC Crossroads vol. 1, 1996, pp. 1-13, retrieved from http://www.acm.org/crossroads/.xrds3-1/aied.html on Apr. 12, 2002.

Benson, G.S., et al., "Best Practices in Training Delivery," Technical & Skills Training, 1996, pp. 14-17.

Bental, D., et al., "Personalized and Adaptive Systems for Medical Consumer Applications," Communications of the ACM, vol. 45, No. 5, 2002, pp. 62-63.

Benyon, D., et al., "Adaptive Systems: from intelligent tutoring to autonomous agents," Abstract, 1993, 52 pages.

Berst, "It's Baa-aack. How Interactive TV is Sneaking Into Your Living Room", The AnchorDesk, May 10, 1999.

Berst, "Why Interactive TV Won't Turn You On (Yet)", The AnchorDesk, Jul. 13, 1999.

Blue Pumpkin (bluepumpkin.com web pages dated Mar.-May 2005), retrieved from web.archive.org May 7, 2009.

Blue Pumpkin Advisor Enterprise, (Blue Pumpkin Advisor Enterprise product brief), Blue Pumpkin Software, Inc., PN PB006b, Apr. 5, 2004.

Blue Pumpkin Activity Manager (product brief), Blue Pumpkin Software, Inc., PN PB005b, Apr. 5, 2004.

Blumenthal, R., et al., "Reducing Development Costs with Intelligent Tutoring System Shells," 1996, pp. 1-5, retrieved from http://advlearn.lrdc.pitt.edu/its-arch/papers/blumenthal.html on Apr. 9, 2002.

Borland and Davis, "US West Plans Web Services on TV", CNETNews.com, Nov. 22, 1999.

Borland, et al., "US West Plans Web Services on TV," CNETNews.com, Nov. 22, 1999.

Brown, "Let PC Technology be Your TV Guide", PC Magazine, Jun. 7, 1999.

Brown, "Interactive TV: The Sequel", NewMedia, Feb. 10, 1998.

Brusilovsky, P., et al., "Adaptive Educational Systems on the World-Wide-Web: A Review of Available Technologies," pp. 1-10, retrieved from http://manic.cs.umass.edu./~stern/webits/itsworkshop?brusilovskv.html on Apr. 12, 2002.

Brusilovsky, P., et al., "Distributed intelligent tutoring on the Web," Proceedings of the 8th World Conference of the AIED Society, Kobe, Japan, Aug. 18-22, 1997, 9 pages.

Brusilovsky, P., et al., ISIS-Tutor: An Intelligent Learning Environment for CD/ISIS Users, pp. 1-15, retrieved from hppt://cs.joensuu.fi/~mtuki/www_clce.270296/Brusilov.html on May 2, 2002.aho.

Byrnes, R., et al., "The Development of a Multiple-Choice and True-False Testing Environment on the Web," 1995, 8 pages, retrieved from http://ausweb.scu.edu.au/aw95/education3/byrnes/index.html.

Calvi, L., et al., "Improving the Usability of Hypertext Courseware through Adaptive Linking," ACM, 1997, 2 pages.

Cline, "Deja vu—Will Interactive TV Make It This Time Around?", DevHead, Jul. 9, 1999.

Coffey, D., "Are Performance Objectives Really Necessary?" Technical Skills & Training, 1995, pp. 25-27.

Cohen, S., "Knowledge Management's Killer App," ASTD, pp. 1-11, retrieved from http://www.astd.org/CMS/templates/index.html?template on Apr. 12, 2002.

Cole-Gomolski, B., "New ways to manage E-Classes," Computerworld vol. 32, No. 48, 1998, p. 4344.

(56) References Cited

OTHER PUBLICATIONS

Communitywfm.com Symon's "Community" software website, downloaded from web.archive.org, Aug. 2003.
Concevitch, Bill Byron, "Improving Your Performance by Creating a Dynamic Learning Environment. (Call Center/CRM Management Scope)", Customer Interaction Solutions, Oct. 1, 2003, High Beam Research (Accessed May 25, 2009.
Cross, J., "Sun Microsystems—the SunTAN Story," Internet Time Group 8, 2001, 5 pages.
Crouch, "TV Channels on the Web", PC World, Sep. 15, 1999.
"Customer Spotlight: Navistar International," Web page, unverified print date of Apr. 1, 2002.
Cybulski, J.L., et al. "Teaching Systems Analysis and Design Using Multimedia and Patterns," Department of Information Systems, University of Melbourne, 2015, 11 pages.
D'Amico, "Interactive TV Gets $99 set-top box", IDG.net, Oct. 6, 1999.
Davis, "Satellite Systems Gear Up for Interactive TV Fight", CNETNews.com, Sep. 30, 1999.
De Bra, P., "Adaptive Educational Hypermedia on the Web," Communications of the ACM, vol. 45, No. 5, 2002, pp. 60-61.
De Bra, P., et al., "Adaptive Hypermedia: From Systems to Framework," ACM, 2000, 6 pages.
Dharmapurikar, Sarang et al., "Fast and Scalable Pattern Matching for Network Intrusion Detection Systems", IEEE Journal on Selected Areas in Communications, Oct. 2006, vol. 24, Issue 10, pp. 1781-1792.
Diederich, "Web TV Data Gathering Raises Privacy Concerns", ComputerWorld, Oct. 13, 1998.
Dennis, V.E., et al., "Computer Managed Instruction at Arthur Andersen & Company: A Status Report," Educational Technology, 1992, pp. 7-16.
Diessel, T., et al., "Individualized Course Generation: A Marriage Between CAL and ICAL," Computers Educational, vol. 22, Nos. 1 and 2, 1994, pp. 57-64.
DKSystems Integrates QM Perception with OnTrack for Training, Web page, unverified print date of Apr. 1, 2002, unverified cover date of Jun. 15, 1999.
Dyreson, C., "An Experiment in Class Management Using the World-Wide Web," 12 pages, retrieved from http://ausweb.scu.edu.au/aw96/educp/dvreson/paper.htm on Apr. 12, 2002.
EchoStar, "MediaX Mix Interactive Multimedia With Interactive Television", PRNews Wire, Jan. 11, 1999.
Eklund, J., et al., "The Value of Adaptivity in Hypermedia Learning Environments: A Short Review of Empirical Evidence," 8 pages, retrieved from the internet on May 2, 2002.
"E-Learning: the future of learning," THINQ by eLearnity, Version 1.0, 2000, 35 pages.
Eline, L., "A Trainer's Guide to Skill Building," Technical Training, 1998, pp. 34-41.
Eline, L., "Bridging the Gap in Canada's IT Skills," Case Study, Technical & Skills Training, 1997, pp. 23-25.
Eline, L.," IBT's Place in the Sun," Case Study, Technical Training, 1997, pp. 12-17.
"Excellence in Practice Award: Electronic Learning Technologies," E Learning Community, Personal Learning Network, ASTD, 11 pages, retrieved from the internet on Apr. 12, 2002.
Fisk, Mike et al., Abstract from "Applying Fast String Matching to Intrusion Detection", Los Alamos National Laboratory, University of California San Diego, May 2004, 22 pages.
Fritz, M., "CB templates for productivity: Authoring system templates for trainers," Emedia Professional, vol. 10, No. 8, 1997, p. 6876.
Fritz, M., "ToolBook II: Asymetrix's updated authoring software tackles the Web," Emedia Professional, vol. 10, No. 2, 1997, 4 pages.
Furger, "The Internet Meets the Couch Potato", PCWorld, Oct. 1996.
Gans, N., et al., Telephone Call Centers: Tutorial, Review, and Research Prospects, Manufacturing & Service Operations Management, INFORMS, vol. 5, No. 2, 2003, pp. 79-141.
Gibson, E., et al., "A Comparative Analysis of Web-Based Testing and Evaluation Systems," 8 pages, retrieved from the internet on Apr. 11, 2002.
Hallberg, et al., "Curving Toward Performance: Following a Hierarchy of Steps Toward a Performance Orientation," Technical Skills and Training pp. 9-11 (Jan. 1997).
Harsha, B., "Online Training "Sprints" Ahead," Technical Training, 1999, pp. 27-29.
Heideman, J., "Training Technicians for a High-Tech Future," Technical & Skills Training, 1995, pp. 11-14.
Heideman, J., "Writing Performance Objectives Simple as A-B-C (and D)," Technical & Skills Training, 1996, pp. 5-7.
Hollman, L., "Train Without Pain: The Benefits of Computer-Based Training Tools," 2000, pp. 1-11, retrieved from http://www.callcentermagazine.com/article/printableArticle?doc_id=CCM20000524S0009 on Mar. 20, 2002.
"Hong Kong Comes First with Interactive TV", SCI-TECH, Dec. 4, 1997.
Kane, AOL-Tivo: You've Got Interactive TV, ZDNN, Aug. 17, 1999.
Kay, "E-Mail in Your Kitchen", PC World Online, Mar. 28, 1996.
"Keeping an Eye on Your Agents," Call Center Magazine, pp. 32-34, Feb. 1993, LPRs & 798.
Kenny, "TV Meets Internet", PC World Online, Mar. 28, 1996.
Klungle, R., "Simulation of a Claims Call Center: A Success and a Failure," Proceedings of the 1999 Winter Simulation Conference, 1999, pp. 1648-1653.
Koole, G et al., "Queueing Models of Call Centers: An Introduction," Annals of Operations Researsch, vol. 113, Kluwer Academic Publishers, The Netherlands, 2002, pp. 41-59.
Koonce, "Where Technology and Training Meet," Technical Training pp. 10-15 (Nov./Dec. 1998).
Kursh, "Going the distance with Web-based training," Training and Development 52(3):5053 (Mar. 1998).
Larson, "Enhancing Performance Through Customized Online Learning Support," Technical Skills and Training pp. 25-27 (May/Jun. 1997).
Lesgold, Alan, "On Evaluating Educational Innovations," Pamphlet, cover date of Mar. 5, 1998.
Linderholm, "Avatar Debuts Home Theater PC," PC World Online, Dec. 1, 1999.
Linton et al., "OWL: A Recommender System for Organization-Wide Learning," Educational Technical Society 3(1):62-76 (2000).
Lucadamo, et al., "Best Practices in Technical Training," Technical Training pp. 21-26 (Oct. 1997).
McNamara, "Monitoring Solutions: Quality Must Be Seen and Heard," Inbound/Outbound pp. 66-67 (Dec. 1989).
Merrill, "The New Component Design Theory: Instruction design for courseware authoring," Instructional Science 16:19-34 (1987).
Metheus X Window Record and Playback, XRP Features and Benefits, 2 pages, Sep. 1994 LPRs.
Minton-Eversole, "IBT Training Truths Behind the Hype," Technical Skills and Training pp. 15-19 (Jan. 1997).
Mostow, J., et al., "The Sounds of Silence: Towards Automated Evaluation of Student Learning in a Reading Tutor that Listens," Project LISTEN, Carnegie Mellon University, Pittsburgh, PA, 1997, 7 pages.
Mizoguchi, "Intelligent Tutoring Systems: The Current State of the Art," Trans. IEICE E73(3):297-307 (Mar. 1990).
Mostow, J., et al., "The Sounds of Silence: Towards Automated Evaluation of Student Learning a Reading Tutor that Listens" American Association for Artificial Intelligence, 1997, 7 pages.
Mullier et al., "A Web base Intelligent Tutoring System," pp. 1-6, Web page, unverified print date of May 2, 2002.
Nash, Database Marketing, 1993, pp. 158-165, 172-185, McGraw Hill, Inc., USA.
Needle, "Will the Net Kill Network TV?" PC World Online, Mar. 10, 1999.
Nelson et al., "The Assessment of End-User Training Needs," Communications ACM 38(7):27-39 (Jul. 1995).

(56) References Cited

OTHER PUBLICATIONS

"New Adaptiv WorkFORCE/Call Center Edition Software Can Schedule by Skill, Automatically-Budgets, Benefits, Rules All Present and Accounted for, Too" from internet site located at http://findarticles.com/p/articles/mi_m0EIN/is_1998_Oct_19/ai_53094247, retrieved on Sep. 9, 2008, 5 pages.

"NICE and Cisco ICM/IPCC integration", (Feb. 2003), http://www.cisco.com/en/US/solutions/collateral/ns340/ns394/ns165/ns45/ns14/net_brochure09186a00800a3292.pdf.

"NICE Systems announces interoperability of its VoIP recording technology with Cisco Systems' customer contact software platform", Business Wire, Jul. 3, 2001. http://findarticles.com/p/articles/mi_m0EIN/is_2001_July_3/ai_76154034.

"NICE Systems announces the next generation of active VoIP recording solutions", Press Release, NICE Systems, Mar. 14, 2006, http://www.nice.com/news/show_pr.php?id=581.

O'Herron, "CenterForce Technologies' CenterForce Analyzer," Web page, unverified print date of Mar. 20, 2002, unverified cover date of Jun. 1, 1999.

O'Roark, "Basic Skills Get a Boost," Technical Training pp. 10-13 (Jul./Aug. 1998).

"OnTrack Online" Delivers New Web Functionality, Web page cover date of Oct. 5, 1999.

Papa et al., "A Differential Diagnostic Skills Assessment and Tutorial Tool," Computer Education 18(1-3):45-50 (1992).

Paynich, Vitisia, "Call Centers Benefit from a Blended Learning Environment: A One-On-One Conversation with the Call Center School's Co-founder. (Straight Talk)", E-Learning, Jan. 1, 2003, High Beam Research (Accessed May 25, 2009), http://www.highbeam.com/doc/1G1-96693830.html29/2006.

Phaup, "New Software Puts Computerized Tests on the Internet: Presence Corporation announces breakthrough Question Mark Web product," Web page, unverified print date of Apr. 1, 2002.

Phaup, "QM Perception Links with Integrity Training's WBT Manager to Provide Enhanced Assessments for Web-Based Courses," Web page, unverified print date of Apr. 1, 2002, unverified cover date of Mar. 25, 1999.

Phaup, "Question Mark Introduces Access Export Software," Web page, unverified print date of Apr. 2, 2002, unverified cover date of Mar. 1, 1997.

Phaup, "Question Mark Offers Instant Online Feedback for Web Quizzes and Questionnaires: University of California assist with Beta Testing, Server scripts now available to high-volume users," Web page, unverified print date of Apr. 1, 2002, unverified cover date of May 6, 1996.

Piskurich, "Now-You-See-'Em, Now-You-Don't Learning Centers," Technical Training pp. 18-21 (Jan./Feb. 1999).

"Price Waterhouse Coopers Case Study: The Business Challenge," Web page, unverified cover date of 2000.

Quiggins et al., "A New approach to Contact Center Optimization," IEX Corporation, Jun. 21, 2004.

Read, "Sharpening Agents' Skills," pp. 1-15, Web page, unverified print date of Mar. 20, 2002, unverified cover date of Oct. 1, 1999.

Reid, "On Target: Assessing Technical Skills," Technical Skills and Training pp. 6-8 (May/Jun. 1995).

Rohde, L., "Gates touts interactive TV," CNN.com, 1999, 2 pages.

Rohde & Schwarz, "ACCESSNET-T DMX-500 R2 Digital Mobile eXchange", Secure Communications, Product Flyer, Version 03.00, May 2010, 4 pages.

Rohde & Schwarz, "ACCESSNET-T IP", Secure Communications, Version 01.00, May 2010, 4 pages.

Rohde & Schwarz, "Digital Standards for R&S SMU200A, SMATE200A, SMJ100A, SMBV100A, AMU200A", Secure Communications, Version 05.00, Sep. 2009, 68 pages.

Rohde & Schwarz, R&S AMMOS GX425 Software, 2010, 1 page.

Rohde & Schwarz, Integrated Digital Audio Software R&S AllAudio, 2010, 8 pages.

Rohde & Schwarz, R&S RAMON COMINT/CESM Software, Radiomonitoring & Radiolocation, Version 01.00, Jun. 2010, 22 pages.

Rohde & Schwarz, R&S AMMOS GX430 PC-Based Signal Analysis and Signal Processing Software, 2010, 1 page.

Rohde & Schwarz, R&S TMSR200, Version 3.0, Aug. 14, 2009, 10 pages.

Ross, "Broadcasters Use TV Signals to Send Data", PC World, Oct. 1996.

"Setting up switched port analyzer for monitoring and recording IP-ICD agents on the Cisco ICS 7750", Cisco Systems, Nov. 22, 2002. http://www.cisco.com/en/US/docs/routers/access/ics7750/software/notes/icsspan.html.

Stearns, Nathan, "Applying Inbound Techniquestto Outbound in Workforce Management," Customer Inter@ction Solutions, Oct. 2005, 24(4), 52-55 (Retrieved May 4, 2009 from ABI/INFORM Global database, Document ID: 923689061).

Stewart, "Interactive Television at Home: Television Meets the Internet", Aug. 1998.

Stormes, "Case Study: Restructuring Technical Training Using ISD," Technical Skills and Training pp. 23-26 (Feb./Mar. 1997).

Tennyson, "Artificial Intelligence Methods in Computer-Based Instructional Design," Journal of Instruction Development 7(3):17-22 (1984).

Tinoco et al., "Online Evaluation in WWW-based Courseware," ACM pp. 194-198 (1997).

Tongaonkar, Alok S., Abstract from "Fast Pattern-Matching Techniques for Packet Filtering", Stony Brook University, May 2004, 44 pages.

TotalView WebStation Guide, Release 3.7, Document No. 1 602-660, Jun. 2004, IEX Corporation Jun. 2004.

Uiterwijk et al., "The virtual classroom," InfoWorld 20(47):6467 (Nov. 23, 1998).

Unknown Author, "Long-distance learning," InfoWorld 20(36):7276 (1998).

Untitled, 10th Mediterranean Electrotechnical Conference vol. 1 pp. 124-126 (2000).

Valls, V., et al., "Skilled Workforce Scheduling in Service Centres," European Journal of Operational Research (EJOR), vol. 193, No. 3, 2009, pp. 791-804.

Wallace, R., et al., "A Staffing Algorithm for Call centers with Sill-Based Routing," Manufacturing & Service Operations Management, vol. 7, No. 5, 2005, pp. 276-294.

Watson and Belland, "Use of Learner Data in Selecting Instructional Content for Continuing Education," Journal of Instructional Development 8(4):29-33 (1985).

Weinschenk, "Performance Specifications as Change Agents," Technical Training pp. 12-15 (Oct. 1997).

Wilson, "U.S. West Revisits Interactive TV", Interactive Week, Nov. 28, 1999.

Witness Systems, "Bringing eQuality to eBusiness," promotional brochure, 2000, 1 page.

Wittwer, J., "How to Create a Timeline in Excel," 2005.

Yu et al., "Fast and Memory-Efficient Regular Expression Matching for Deep Packet Inspection", ANCS, Dec. 3-5, 2006, San Jose, California, 10 pages.

Yu, Fang et al., Abstract from "Gigabit Rate Packet Pattern-Matching Using TCAM", Proceedings of the 12th IEEE International Conference on Network Protocols, ICNP, 2004, 4 pages.

| VL Activity Template 230 |
|---|
| Activity 410 Lunch/Break/Training/ SalesQueue/ SupportQueue |
| Queue(s) 420 |
| StartType 430 Any/Relative/Absolute |
| StartTime 440 [Range] |
| Period 450 |
| Count 460 [Range] |
| Duration 470 [Range] |

FIG. 4

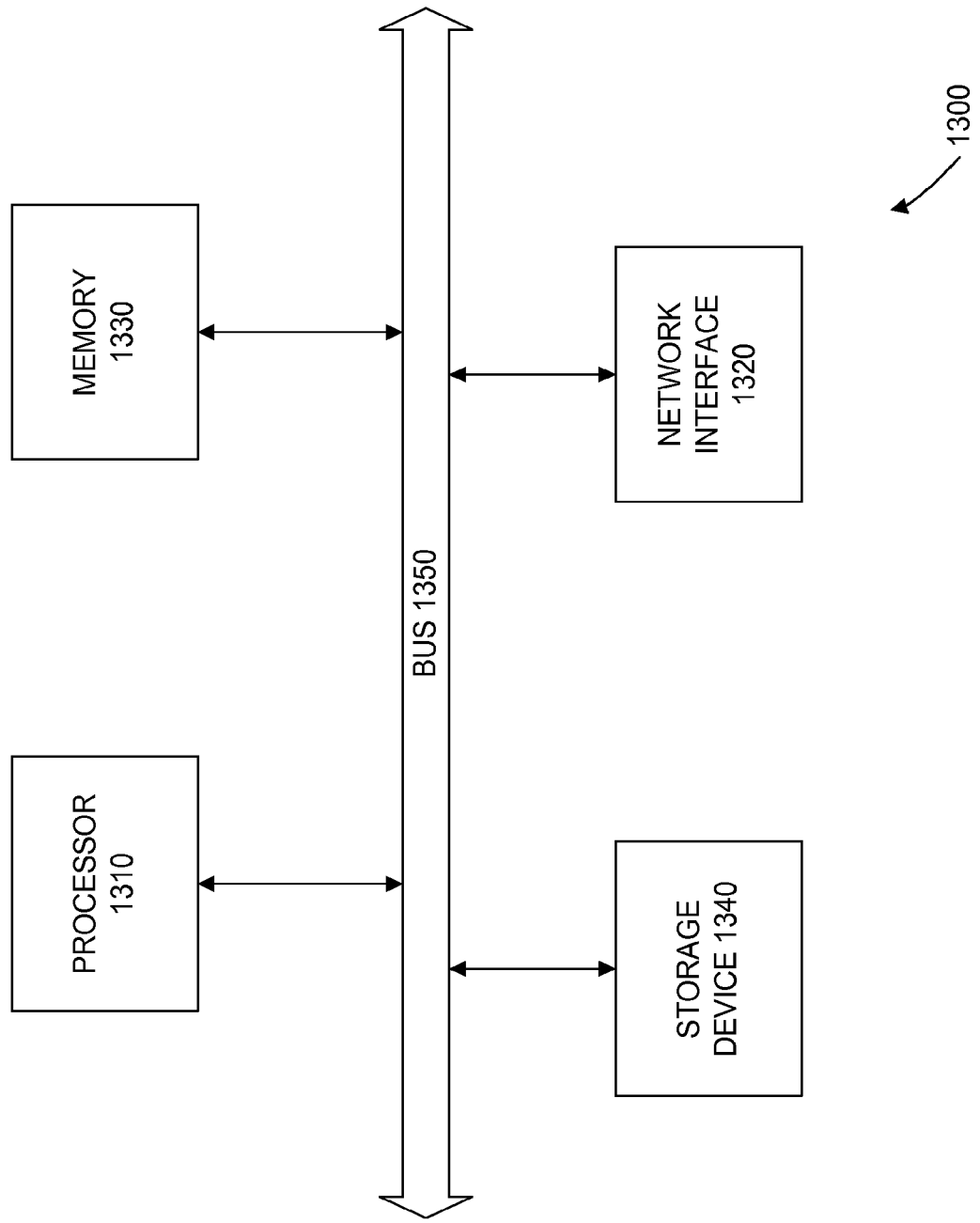

SYSTEMS AND METHODS FOR AUTOMATIC SCHEDULING OF A WORKFORCE

CROSS-REFERENCE TO RELATED APPLICATIONS

This application is a continuation of U.S. patent application Ser. No. 12/916,678, filed Nov. 1, 2010, which application claims priority to U.S. Provisional Patent Application No. 61/256,579, filed Oct. 30, 2009, U.S. Provisional Patent Application No. 61/256,586, filed Oct. 30, 2009, and U.S. Patent Application No. 61/256,599, filed Oct. 30, 2009, the contents of which are expressly incorporated herein by reference in their entireties.

BACKGROUND

Many of today's contact centers use skill-based routing, where contacts are queued and distributed to agents according to agent skills. In some skill-based routing environments, it is desirable to assign a multi-skilled agent to service all queues for which the agent has the appropriate skill. In other skill-based routing environments, it is desirable to assign a multi-skilled agent to service a specific queue, or queues, for which the agent has the appropriate skill.

The second option, called "queue hopping" is usually less efficient. However, there are a number of reasons why queue hopping might be appropriate for a call center. Some of the reasons include: the ability to track exact capacity for specific queues at specific times; scheduling solid blocks of scheduled time for particular queues reduces the cost of agent context switching among queues; limitations in contact routing technology or in workstation application software; and the ability to move low-skilled agents to an exceptionally high volume queue.

SUMMARY

Systems and methods are disclosed for scheduling a workforce. In one implementation, a method of workforce scheduling includes receiving a shift activity template describing at least one worker activity performed during a shift, the template having a range of start times and a variable length for the at least one activity, the at least one activity being associated with a queue that has varying incoming volumes at different times and varying goals such that some work associated with the queue needs to be completed before other work associated with the queue, the shift activity having at least one activity being designated as a flexible activity; receiving an association between the shift activity template and at least one worker, and scheduling a plurality of schedulable objects using heuristic searches in accordance with a workload forecast and schedule constraints, each of the schedulable objects being based on the shift activity template.

In some implementations, a method of workforce scheduling includes receiving a shift activity template describing at least one worker activity performed during a shift, the template having a range of start times and a variable length for the at least one activity; receiving an association between the shift activity template and at least one worker, defining a time bank of weekly target hours for the at least one worker over a predetermined period; and scheduling a plurality of schedulable objects associated with the at least one worker in accordance with a workload forecast, schedule constraints and the time bank.

In yet other implementations, a method of workforce scheduling includes receiving a shift activity template describing at least one worker activity performed during a shift, the template having a range of start times and a variable length for the at least one activity, the at least one activity being associated with a first queue that is based on a second queue; receiving an association between the shift activity template and at least one worker, and scheduling a plurality of schedulable objects in accordance with a workload forecast of the first queue and a schedule of the second queue.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

FIG. 4 is a block diagram showing one representation of a variable-length activity template (FIG. 2).

FIG. 13 is a hardware block diagram of a general-purpose computer that can be used to implement various embodiments of systems and methods for automatic scheduling of a workforce.

DETAILED DESCRIPTION

Figure 1:
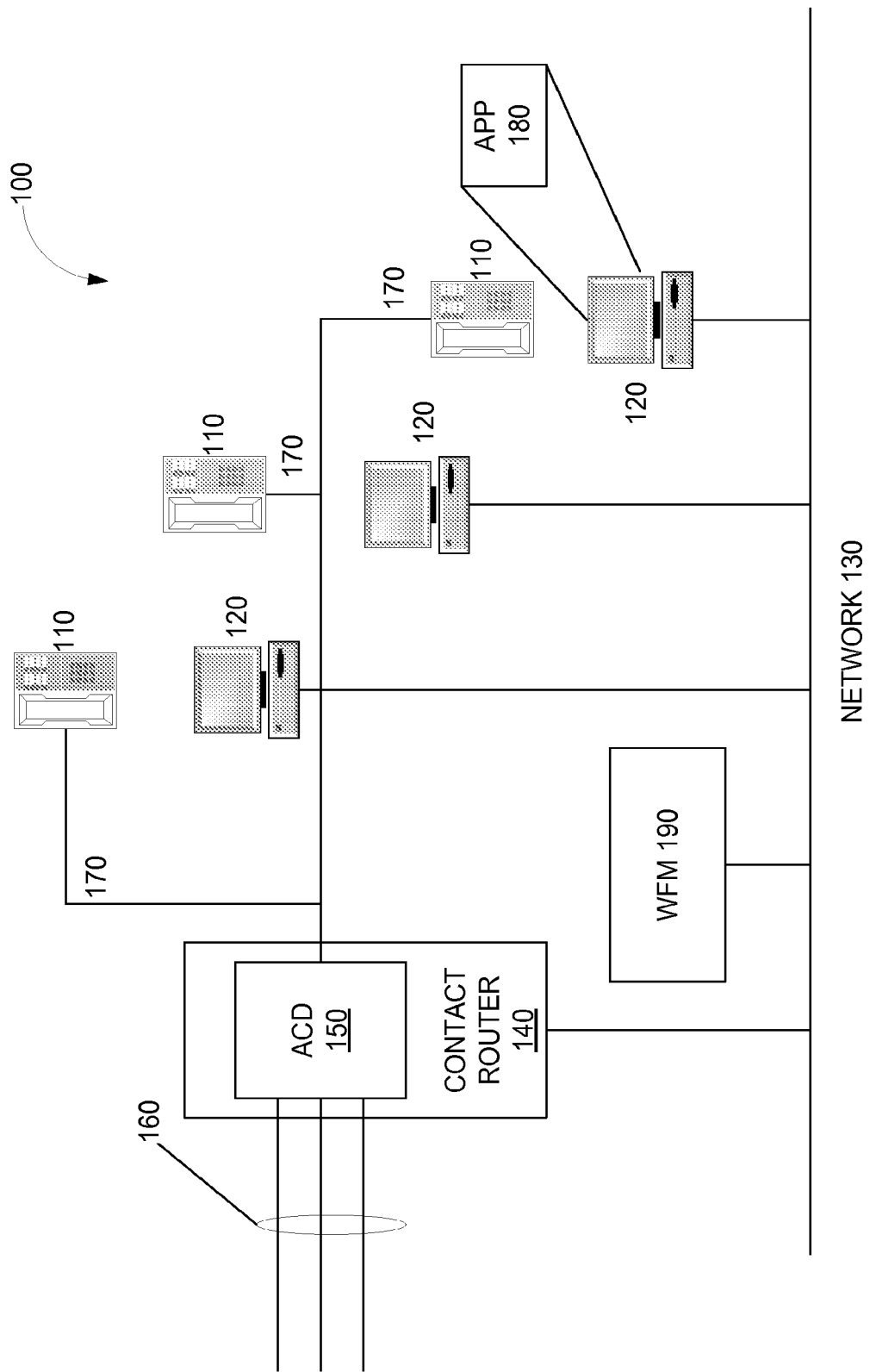
FIG. 1 is a block diagram of a contact center environment 100.

FIG. 1 is a block diagram of a contact center environment 100. Contact center 100 is staffed by agents who handle incoming and/or outgoing contacts. Although the traditional and most common form of contact is by phone, other types of contacts can be used, such as text chat, web collaboration, email, and fax. An agent workspace includes an agent phone 110 and a workstation computer 120. A network 130 connects one or more of the workstations 120.

A contact router 140 distributes or routes contacts (incoming or outgoing) to an agent position. Voice over Internet Protocol (VoIP) calls and computer-based contacts (e.g., chat, email) are routed over one or more data networks, and distributed over network 130 to one of the agent workstations 120. Contact router 140 may include an automatic call distributor (ACD) 150 to route phone contacts. The embodiments described herein will refer to ACD 150 instead of contact router 140, but analogous contact router actions and operations are intended to be captured by this disclosure. Note that a predictive dialer (not shown) could be used for directing outbound calls to agents for handling.

If an agent is not available to handle a particular call, ACD 150 puts the call into a queue, which effectively places the caller on hold. When an agent is available, ACD 150 connects the outside trunk line 160 carrying the phone call to the trunk line 170 of a selected agent.

When an agent is ready to handle contacts, the agent first logs into ACD 150. This login notifies ACD 150 that the agent is available to take calls. An agent's ACD state changes throughout the workday, as the agent performs work activities such as handling calls, performing after-call work, and taking breaks. An example list of states includes available, busy, after-call work, and unavailable.

While handling a contact, the agent interacts with one or more applications 180 running on workstation 120. By way of example, workstation applications 180 could provide the agent with access to customer records, product information, ordering status, and transaction history. The applications 180 may access one or more business databases (not shown) via the network 130.

Contact center 100 also includes a work force management system (WFMS) 190. WFMS 190 performs many functions. One such function is providing a contact center supervisor or manager with information about agents and contacts, both historical and real-time. Another function is supplying the supervisor with information on how well each agent complies with contact center policies. Yet another function is calculating staffing levels and creating agent schedules based on historical patterns of incoming contacts. The functionality of the entire work force management system 190 is typically divided among several applications, some of which have a user interface component, and WFMS 190 comprises the suite of applications.

In the environment described above, the workers assigned to shifts are contact center agents. However, the scheduling methods and systems described herein are also applicable to scheduling other kinds of workers in other types of work environments. Therefore, the remaining embodiments will refer to workers rather than agents.

Figure 2:
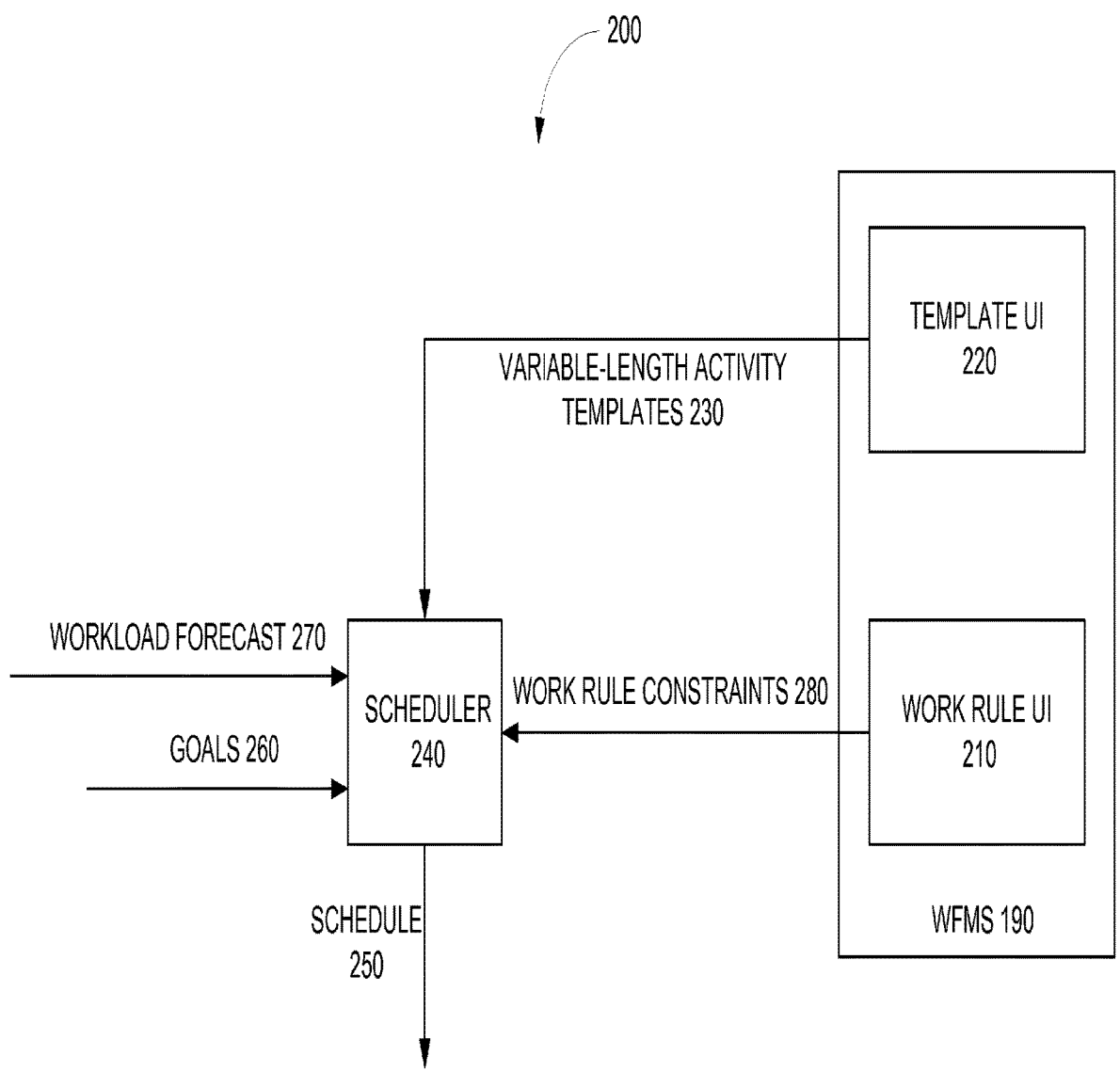
FIG. 2 is a dataflow diagram showing one embodiment of a system (200) for automatic scheduling of a workforce.

FIG. 2 is a dataflow diagram showing one embodiment of a system (200) for automatic scheduling of a workforce. A user interacts with a work-rule user interface component 210 of WFMS 190 to define work rules such as maximum shift length, allowable shift start times, and break requirements. A user also interacts with a template user interface component 220 to define one or more variable-length activity templates 230. A variable-length activity template 230 describes a worker activity that can vary in length. Although shown as two separate components in FIG. 2, in another embodiment the template user interface 220 and work-rule interface 230 are combined into a single user interface. Variable-length activity templates 230 are provided as input to a scheduler 240, which produces a schedule 250 that attempts to optimize goals 260 while meeting a workload forecast 270 and a set of work rule constraints 280.

Figure 3:
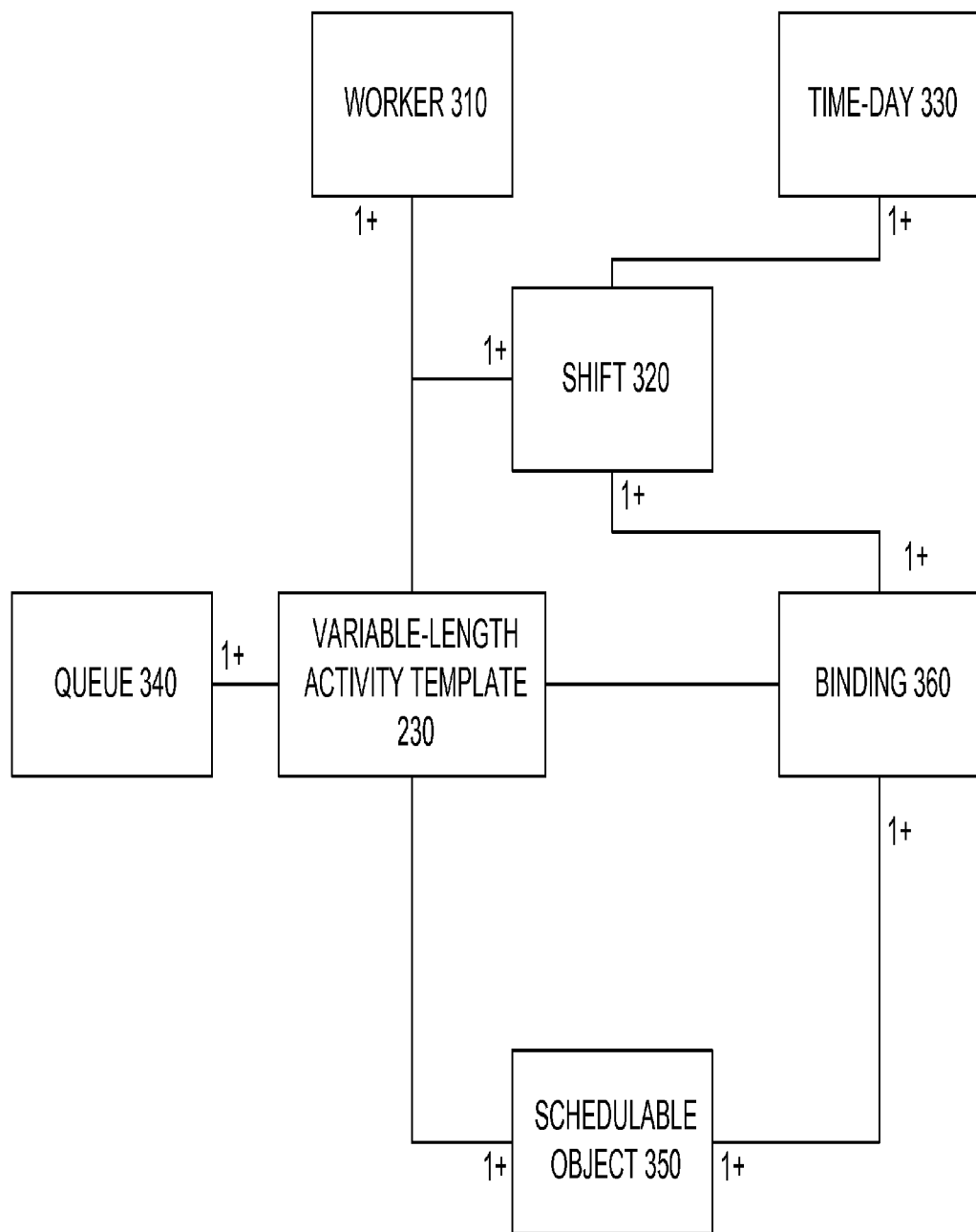
FIG. 3 shows a set of entities, or objects, and the inter-relationships between them, used by one embodiment of a scheduler (FIG. 2) that supports automatic scheduling of a workforce.

FIG. 3 shows a set of entities, or objects, and the inter-relationships between them, used by one embodiment of a scheduler 240 that supports automatic scheduling of a workforce. Each worker 310 is associated with one or more shifts 320, where a shift 320 is described by a time range and a day (330). As can be seen in FIG. 3, a worker 310 can have more than one shift 320, and a time range-day 330 can be associated with more than one shift 320 (e.g., different workers). However, a particular shift 320 is specific to a worker and to a time range-day (e.g. a shift representing "John Doe on Monday 9 AM-5 PM").

A variable-length activity template 230, which is associated with at least one worker 310 and at least one shift 320, describes an activity related to servicing a particular contact router queue 340, and the allowable time slots during the shift 320 when the activity can be scheduled. The duration of the queue-specific activity is flexible rather than fixed. Scheduler 240 creates one or more schedulable objects 350 based on each template 230, such that attributes in a schedulable object 350 are initialized from corresponding attributes in the template 230. Each schedulable object 350 represents an instance of the template's activity which can be assigned somewhere during the shift 320.

Scheduler 240 also creates a set, or domain, of bindings 360 for each shift 320. A binding 360 represents a particular time slot in a shift 320. As can be seen in FIG. 3, a schedulable object 350 can possibly be bound to more than one binding 360. Scheduler 240 chooses one optimal binding 360 for each schedulable object 350. By selecting a binding for a schedulable object, scheduler 240, in effect, assigns the work activity for that one object (derived from a template) to the time slot specified in the binding. A person of ordinary skill in the art should be familiar with the concepts of schedulable objects, binding domains, and optimal binding.

As described earlier, the duration of the activity in template 230 is variable. Without a template for this variation, a contact center supervisor wishing to schedule variable-length queue-specific activities would need to define a large number of shifts (e.g., one shift for Q1 activity=1 hour and Q2 activity=4 hours, another shift for Q1 activity=2 hours and Q2 activity=4 hours, and yet another for Q1 activity=2 hours and Q2 activity=3 hours, etc.) The use of template 230 allows the supervisor to instead define a small number of variable-length activity templates 230 to capture the possible combinations of queue-specific activities with varying length. The scheduler 240 then uses the templates 230 to create a collection of objects 350 that, in conjunction with the set of bindings 360, represents this variation in duration. The variation in duration of schedulable objects 350 allows scheduler 240 to produce a more optimal schedule. The process of creating schedulable objects 350, creating bindings 360, and choosing optimal bindings will be discussed further in connection with FIGS. 5-7.

FIG. 4 is a block diagram showing one representation of a variable-length activity template 230. In this embodiment, variable-length activity template 230 includes the following attributes: an activity 410; one or more queues 420; a start type 430; a start time range 440; a period 450; a count 460; and a duration 470. Activity 410 represents the expected activity to be performed during the shift associated with this template 230. In one embodiment, activities 410 include non-work activities related to a shift such as lunch and break. In another embodiment, activity 410 is a work activity associated with a specific queue. In yet another embodiment, activity 410 can be either a shift activity or a queue-specific activity.

Start type 430 and start time 440 define a range of start times. If start type 430 is Absolute, start time 440 simply specifies a range of start times for activity 410 (e.g., 11:00 AM-12:00 PM). If start type 430 is Relative, then start time 440 specifies a range of start times for activity 410, and this range is relative to the start time of the shift associated with this template 230. For example, a relative start time 440 of 0:30-1:00, in combination with an associated shift having a start time of 9 AM, specifies that activity 410 can be scheduled to start between 9:30 AM and 10:00 AM.

The total length of time that this activity that can be scheduled, during the entire shift, is specified in one of two ways. Using the first mechanism, count 460 represents the number of periods that can be scheduled, each having length 450. Count 460 is expressed as a range (minimum/maximum). The activity can be scheduled as non-consecutive blocks within the shift. For example, a template with Count=1-4 and Period=0:30 can be used to schedule 1, 2, 3, or 4 half-hour blocks for the activity. The length of the activity is flexible, from 0:30 to 2:00, and so is the scheduling of the individual blocks within the shift.

Using the second mechanism, duration 470 specifies a range (minimum/maximum) of total activity time, where the granularity of the duration is period 450. The time for the activity is consecutive. For example, a template with Period=0:30 and Duration=0:30-2:00 can be used to schedule an activity having length 0:30, or an activity having length 1:00, or an activity having length 1:30, or an activity having length 2:00. The length of the activity is flexible, from 0:30 to 2:00, but the activity is scheduled as a single block within the shift.

Figure 5:
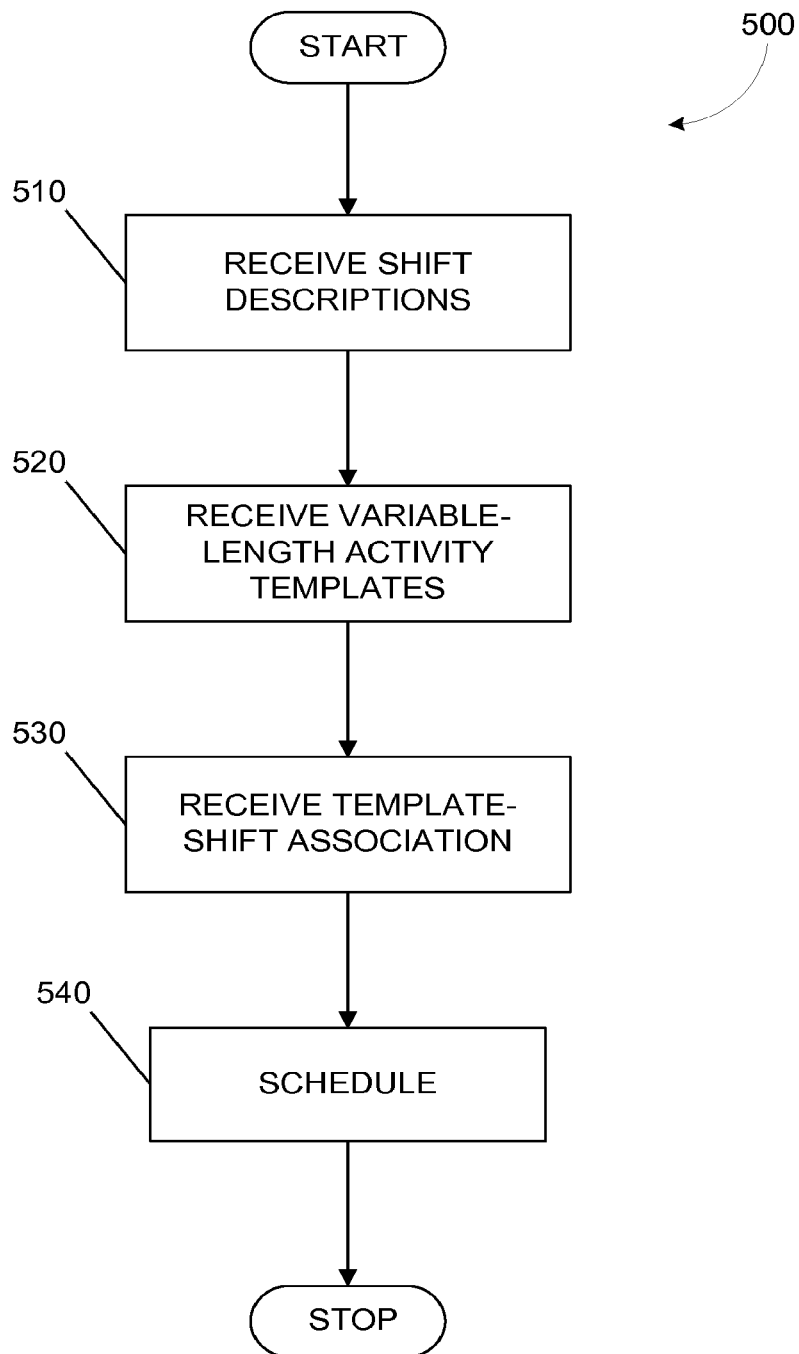
FIG. 5 is a flowchart for one embodiment of a method for automatic scheduling of a workforce.

FIG. 5 is a flowchart for one embodiment of a method (500) for automatic scheduling of a workforce. At block 510, one or more shift descriptions (320) are received. Next (block 520), one or more variable-length activity templates (230) are received. At block 530, at least one association between variable-length activity templates 230 and shift 320 is received. At block 540, schedule 250 is produced based on the received information, in accordance with constraints 280 and goals 260. As will be described in further detail in connection with FIGS. 6-7, schedule 250 is determined by generating schedulable objects and then selecting optimal bindings for these objects.

Figure 6:
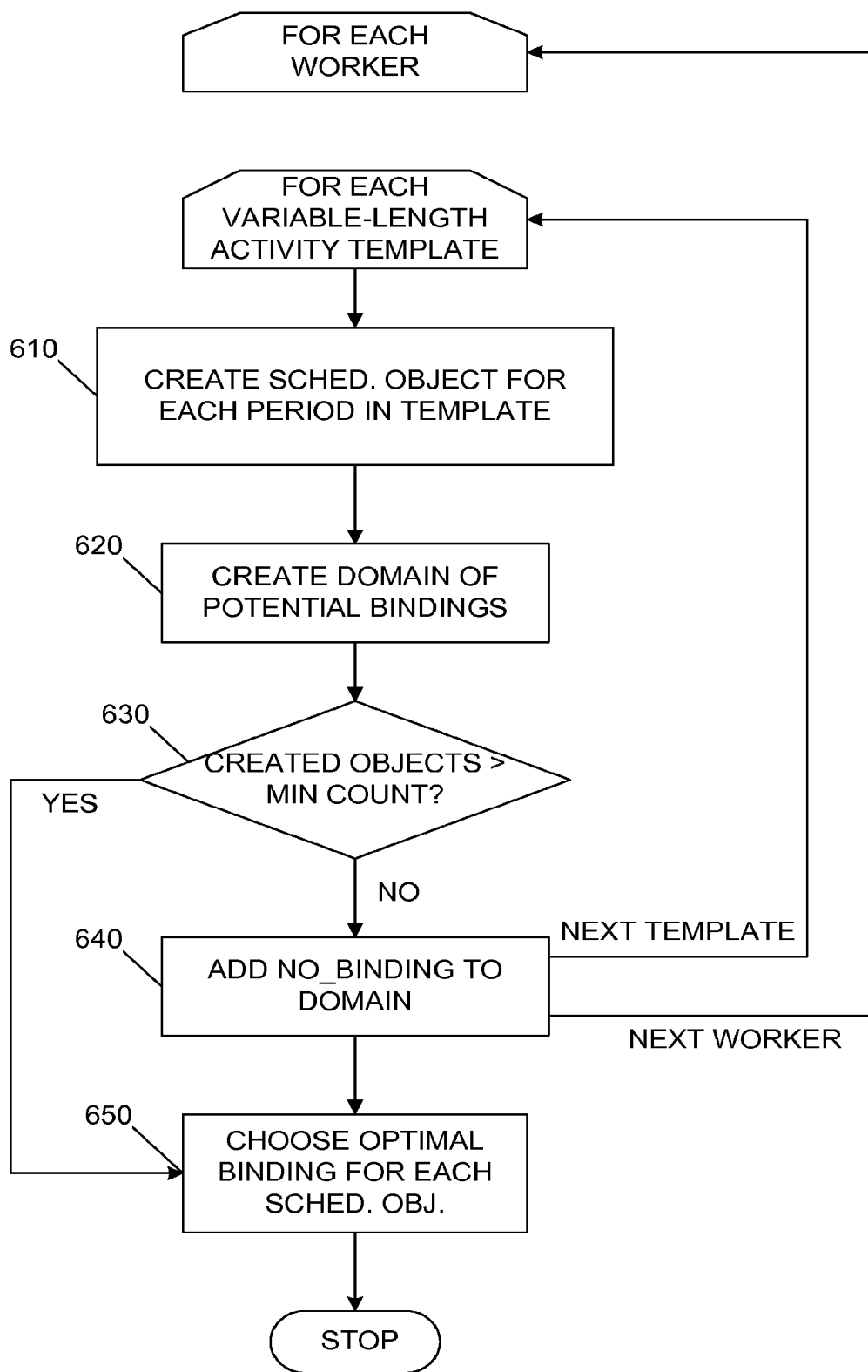
FIG. 6 is a flowchart for one embodiment of scheduler (FIG. 2) for variable-length activities.

FIG. 6 is a flowchart for one embodiment of scheduler 240 that supports automatic scheduling of a workforce. The processing iterates through an outer loop for each worker 310, and an inner loop for each variable-length activity template 230. At block 610, schedulable objects 350 are created from the current variable-length activity template 230 associated with the current worker 310. One object 350 is created for every period 450 in the template 230, which is either given directly by count 460, or is derived as duration (470) divided by period (450).

Figure 7A:
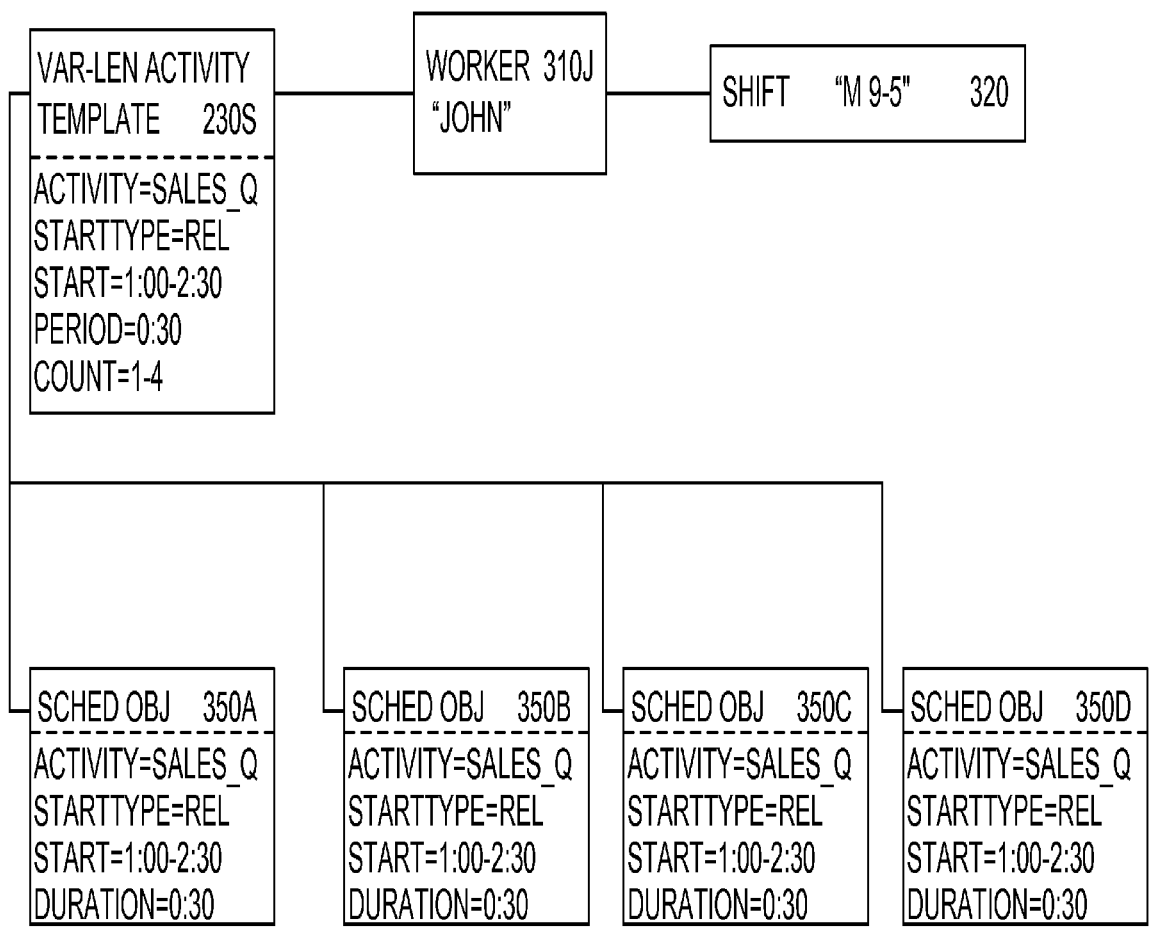
FIGS. 7A and 7B are dataflow diagrams of an example scenario in which variable-length activities are scheduled.
Figure 7B:
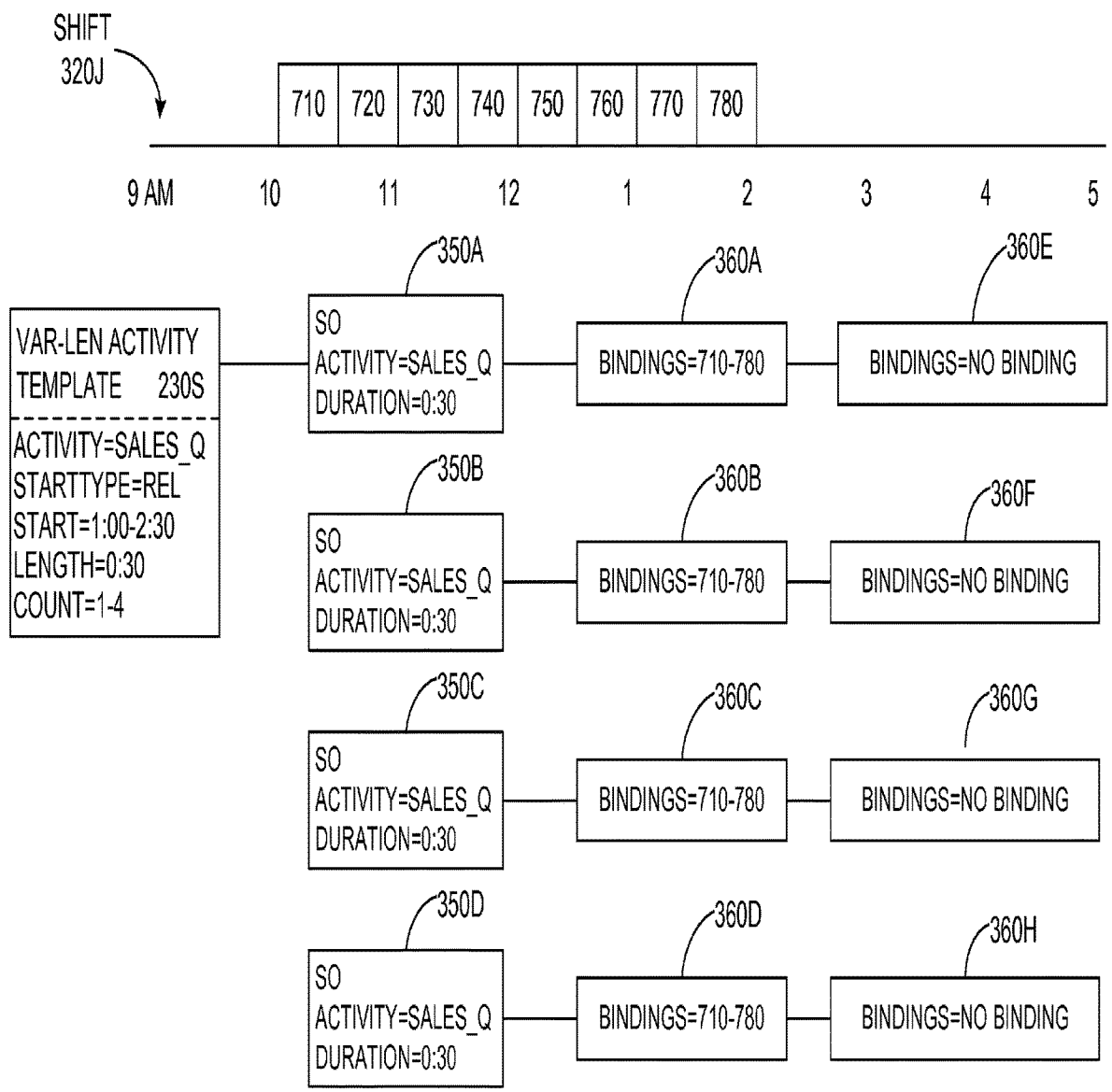

The creation of schedulable objects 350 from variable-length activity template 230 can be seen in the example scenario illustrated in FIGS. 7A and 7B. In this example scenario, as shown in FIG. 7A, schedule 250 includes a single shift 320J ("Monday 9 AM-5 PM"). A worker 310J ("John") is associated with this shift 320J and with a variable-length activity template 230S ("Sales_Q").

From variable-length activity template 230SS, scheduler 240 creates a set of schedulable objects 350 associated with the template. In this example, the template-shift association is indirect, through a template-worker relationship and a worker-shift relationship. Other embodiments are also contemplated, for example a direct association between template and shift, or another indirect relationship such as template-worker, worker-shift, and shift-day.

The number of objects 350 created is equal to the number of periods in an activity of maximum length. In this scenario, variable-length activity template 230S uses the more flexible mechanism to define total activity length, using period 450 and count 460 rather than period 450 and duration 470. Thus, the number of periods is given directly by count 460 in the template. When the alternative mechanism of period 450 and duration 470 is used, the number of periods is equal to maximum duration divided by period length.

The activity attributes of the schedulable objects 350A-D is derived from the corresponding attribute in variable-length activity template 230. The duration of each object 350 is equal to the period 450 specified in the template. Thus in this example scenario there are four schedulable objects (350A-D) each having a "Sales_Q" activity and a duration of 0:30.

Returning to the flowchart in FIG. 6, after schedulable objects are created in block 610, processing continues at block 620, where a set, or domain, of potential bindings is created for the just-created schedulable objects 350. The bindings 360 in the domain are based on shift attributes such as start time and length/end time, and template attributes such as start type and start time range. Creation of bindings 360 will now be discussed in connection with FIG. 7B.

A schedulable object 350 is associated with a shift 320, which has a start time and an end time. Bindings 360 correspond to time slots within a shift that can be assigned to an activity. In the example scenario of FIG. 7B, there are seven half-hour time slots (710-780) between 10:00 AM and 2:00 PM. The attributes of variable-length activity template 230S, in combination with shift 320J, dictate that the bindings 360 start as early as the 10:00 AM time slot (710), since the shift start time is 9:00 AM, the template start time range is 1:00, and the template start type attribute is Relative. The template and shift attributes also dictate that the latest binding is the 1 PM time slot (780), corresponding to a maximum duration shift activity (2:00, or 4*0:30) starting at the latest time possible (11:30).

In this example, total activity length is defined using period 450 and count 460 (rather than period 450 and duration 470). Therefore, the set of bindings (360A-D) for each object (350A-D) is the same, and comprises consecutive slots 710-780. Although the slots are consecutive, the binding for each object is independent of the others: slot 710 can be selected as the optimal binding for 350A, and slot 730 can be selected as the optimal binding for 350B.

Bindings for another embodiment, which defines total activity length using period 450 and duration 470, are created as follows. As explained above, such an activity has a flexible length, but should fill consecutive time slots. In this embodiment, bindings for a later object are dependent on previously created objects. On creation of the first schedulable object 350 (block 610), the bindings 360 for that object are set (block 620) to include all consecutive time slots (in this scenario, slots 710-780). An optimal binding 360 is selected for that first object 350 in block 650. Bindings 360 for each subsequently created objects 360 are constrained to be adjacent to the objects for which a binding has been selected.

Returning to the flowchart in FIG. 6, after schedulable objects 350 and bindings 360 are created in blocks 610 and 620, processing continues at block 630, where the number of objects created is compared to the minimum for count 460 in the current template 230. If the number of created objects is more than the minimum, then at block 640 an additional binding 360, representing No_Binding, is added to the domain of each object that is not required to fulfill the minimum count. For example, if the minimum is 2 and the maximum is 5, then of the 5 created objects, No_Binding is added to the domain of 3 of the objects, but not to the other 2 objects. In the scenario of FIG. 7B, schedulable objects 350A-D each include a binding representing No_Binding (360E-F, respectively).

Creation of schedulable objects 350 and bindings 360 in blocks 610-630 (and in some cases, block 640) is repeated for each template 230, and then for each worker 310. Thus, when block 650 is reached, objects and bindings have been created for all variable-length activity templates 230 associated with all workers 310.

At block 650 the optimal binding 360 for each of the schedulable objects 350 is selected. The techniques that schedulers use to produce an optimal schedule for a given set of inputs (workload, constraints, and goals) should be understood by a person of ordinary skill in the art. Such techniques include, but are not limited to, local search, simulated annealing, and heuristics. The use of schedulable objects and bindings should also be understood by such a person.

Functions of the work force management system (WFMS) 190 related to scheduling variable-length activities have now been described in connection with FIGS. 1-7. In addition or alternatively to the above, the scheduler 240 may provide for activity hopping by employees. Activity hopping functionality schedules employees to work for specific periods of time on specific queues during their shifts. A scheduler component determines how much time to spend on each queue hopping activity, and when these activities should occur in the schedule. Here, the queue has varying incoming volumes at different times and varying goals such that some work associated with the queue needs to be completed before other work associated with the queue. For example, assume there are two activities—Sales and Billing—that agents have to be scheduled for, with Sales being the primary activity. With queue hopping you can schedule flexible duration Billing activity on top of the base activity, Sales, and a scheduling algorithm will determine how many hours of Billing activity to schedule and when they should occur during the shift.

Activity hopping is often implemented in back office operations for a number of reasons. First, while contact centers have sophisticated routing engines such as Automatic Call Distributors (ACD) that can route different call types to agents based on their individual skills, however, back offices may have less capable routing systems. Additionally, some back office tasks such as mail processing cannot be individually routed.

Second, in the contact center, systems like ACDs provide managers the ability to track what work agents are doing and to see when they are idle. In the back office, queue-hopping schedules can allow managers to track what employees are doing in various parts of the day, and, if the shifts are created without primary activities, then managers will also have visibility into when employees are idle. This increased and alternative usage has given rise to a usability enhancements, and scheduling search and scoring algorithms.

Figure 8:
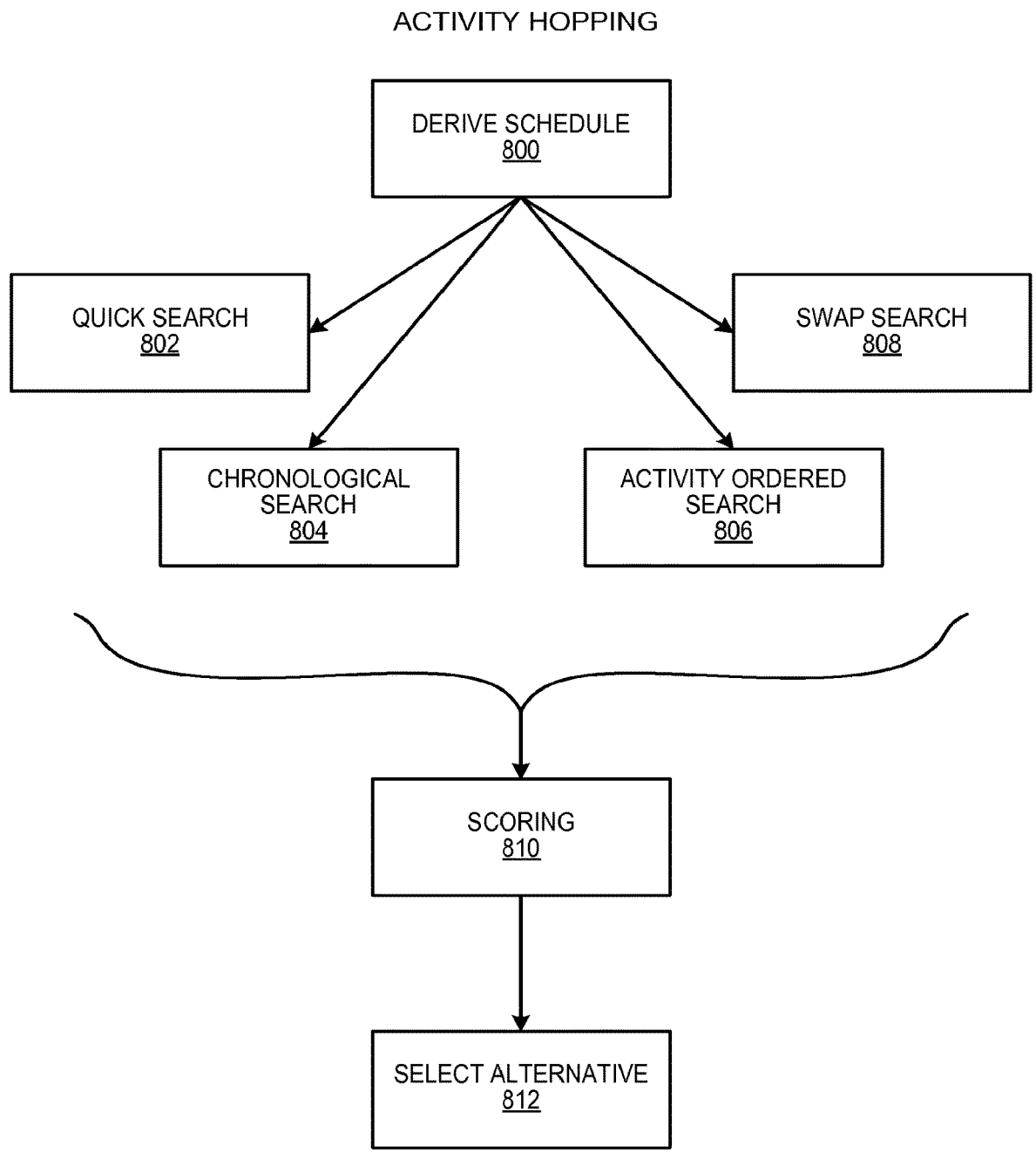
FIG. 8 is a flowchart of a method for providing activity hopping.

Referring now to FIG. 8, in some implementations, the scheduler 240 may begin to derive a schedule at 800. In so doing, the scheduler 240 utilize heuristic searches to work through work through the large number of all possible counts, start times, and activities of employees. The heuristic searches make it possible to reduce the time to derive an optimal schedule in a reasonable amount of time. The scheduler 240 may implement, e.g., four types of searches, each described in more detail below.

In a quick search 802, for each Shift Activity, Maximum Count schedulable objects (variables) is created. Each schedulable object may have a list of possibilities (a domain) consisting of every start-time/activity pair given the start time window defined in the Shift Activity, the Shift Length, the list of flexible activities defined in the Shift Activity, and the skills that the Employee contains. Additionally, the possible start times may be restricted such that each Activity will block into the Shift.

For example, assume that employee A has an eight hour shift that contains a shift activity with the following attributes:
Length: 1 hour
Start Window: Anytime
Activities: Mail Processing, Scanning, Proof Reading
Minimum Count: 5
Maximum Count: 10
As such, employee A has the skills to work the mail processing and scanning activities.

In this case, eight schedulable objects are created as that the maximum count that can actually fit into the Shift's length. Each scheduling object would have a list of: 2 (the number of possible activities)*7 (the number of possible start times given blocks of 1 hour length)=14 possibilities:
Mail Processing starting 0 hours into the Shift
Scanning starting 0 hours into the Shift
Mail Processing starting 1 hour into the Shift
Scanning starting 1 hours into the Shift
Mail Processing starting 2 hours into the Shift
Scanning starting 2 hours into the Shift
. . .
Mail Processing starting 7 hours into the Shift
Scanning starting 7 hours into the Shift Additionally, three of the schedulable objects may also include the "Not Assigned" possibility reflecting the fact the minimum count of five. In other words, five of the Activities must be scheduled, but the last three may or may not be scheduled depending on if there is work to do. Given these schedulable objects and lists of possibilities, a search algorithm that may be used is:
1. order the scheduling objects such that the non-required ones are first
2. for each scheduling object
    schedule using existing local search and scoring to optimize work rules and service goal scores
    if a non required is assigned, replace it with a required
This may be done for each employee and shift in various existing orders.

The above search may be performed each time a shift is created to quickly find placements for each of the shift's activities. If an employee can work many possible activities, the list of possibilities can be long; therefore, e.g., the first three activities may be selected randomly or selected based on a largest backlog.

In some implementations, a chronological search 804 starts with the same schedulable objects and list of possibilities as the quick search 802, above, but applies different orderings and filters. For example, the flexible schedulable objects may be cleared for all Employees and Shifts. This search may be performed for each Employee and Shift, as follows:
1. for each possible start time in chronological order (0 hours, 1 hours, 2 hours, etc. in the example above)
    a. choose a non required scheduling object if they are not already assigned (or not assigned)
    b. filter the list of possibilities for that scheduling object such that it only contains the start time above
    c. schedule using existing local search and scoring to optimize work rules and service goal scores
    d. if an optional scheduling object is bound, replace it with a required Finally, the resultant "best" schedule found may be compared with the initial schedule before clearing. If the initial schedule was superior in score, it is restored. The chronological ordering addresses the case where the zero principal component analysis (PCA) heuristic was locally optimal but leading us to a globally not optimal schedule.

In some implementations, a activity ordering search 806 starts with the same schedulable objects and list of possibilities as the quick search 802, above, but applies different orderings and filters. The flexible schedulable objects are cleared for all Employees and Shifts. This search 806 is done for each employee and shift, as follows:

1. Create a list of all possible activity orderings. For this example, if Employee A has 3 skills, so in total there would be 6 orderings:
   Mail, Scan, Proof
   Mail, Proof, Scan
   Scan, Mail, Proof
   Scan, Proof, Mail
   Proof, Mail, Scan
   Proof, Scan, Mail
2. for each ordering
   a. for each activity in the ordering
      i. for each non-required scheduling object
         1. filter the list of possibilities for that scheduling object such that it only contains the activity above
         2. schedule using existing local search and scoring to optimize work rules and service goal scores
         3. if an optional scheduling object is bound, replace it with a required Finally, the resultant best schedule found is compared with the initial schedule before clearing. If the initial schedule was superior in score, it is restored.

There are cases where even if the shift activities are scheduled in chronological order, it may not be enough to handle certain deadline goals. For example: All work arrives at 8 am of each day. Queue 1 work must be completed by 12 pm, queue 2 work must be completed by 4 pm, queue 3 work must be completed by 8 pm. The chronological search may yield poor results as it will tend to schedule one unit of Queue 1 work before 12 pm, but because it does not know that Queue 1 is more constrained, it will try to schedule a unit of queue 2 or queue 3 work.

If an Employee can work many possible Activities, the list of permutations can be very long. In order to achieve acceptable performance, sampling may be performed, either randomly ordering the Activity Permutations or ordering the Activity Permutations via which Activities/Queues have the shortest service goal. Then, the first, e.g., ten Activity Permutations are selected and the rest may be discarded.

In some implementations, a swap search 808 looks for improvements that could be made by swapping two existing activity blocks, as follows:

1. For each scheduled flexible block in chronological order
   a. For each scheduled flexible block in chronological order
      i. if the activity of the first block is not the same as the second block and both employees are the same employee for each block;
      ii. Filter the domain of the schedulable object of the first block to include only its current start time, but both Activities;
      iii. Similarly, filter the domain of the schedulable object of the second block to include only its current start time, but both Activities; and
      iv. Search both schedulable objects with existing depth first search A performance improvement is to keep track of the two start times and two activities for prior searches that did not result in an improvement, so they can be excluded for future searches.

This search finds all two-way improvements that do not affect the net amount of work being done, but results in better service levels because the work is each done at a different times. There may be cases where the other searches give better net amounts of Activities (e.g., the quick search and the chronological search), but still result in non-optimally placed shift activities that can be repaired with a two-way swap.

In some implementations, there may not be a concept of a primary activity in an understaffed deferred scenario (i.e., where it is not possible to meet all the goals). A scoring term 1810 may be defined to represent each of, e.g., three alternatives, and allow users to choose between them.

Alternative 1—Schedule to Achieve Service Level on as Many Queues as Possible

When service level is zero on any interval, a push forward simulation may be run as described in U.S. Pat. No. 6,952,732. Set a score=$(E-\text{workload completed})^2$, where E represents a very large number. In this case, the score is considered better when the numerical value is low. This score is given higher priority than the service level score term as described in U.S. Pat. No. 6,952,732. This score is then computed for each queue in the scenario and summed. Therefore, this score will be better when the scheduler distributes scheduled activity time (and indirectly work completed) evenly among the queues until a queue achieves positive service level, where at this point the scheduler will continue scheduling the other activities.

Alternative 2—Schedule the Work on the Queues that have the Most Work

When service level is zero on any interval, a push forward simulation may be run, and setting a score=$(\text{workload remaining})^2$. In this case, the score is considered better when the numerical value is low. This score is given higher priority than the service level score term. This score is then computed for each queue in the scenario and summed. As such, this score will be better when the scheduler places all activities on the queue with the highest backlog, until that queue achieves positive service level, where at this point the scheduler will switch to scheduling activities on the queue with the next highest backlog.

Alternative 3—Schedule the Work Proportionately to the Workload on Each Queue

When service level is zero on any interval, a push forward simulation may be run, and then setting a score=$(\text{workload completed/total workload})^{10}$. Again, the score is considered better when the numerical value is low and this score is given higher priority than the service level score. This score is then computed for each queue in the scenario and summed. As such, this score will be best when the scheduler places all activities proportionately to the total workload that arrived on each queue. Typically, the scheduler will place an activity on a low volume queue first as this will result in a big score decrease, then due to the very high exponent (the spike penalty), the scheduler will place an activity on the next queue until the proportion on both queues are equivalent.

Thus, as described above, the scheduler 240 can enhance scheduling of employees where activity hopping is permitted.

Additionally or alternatively to the above, the scheduler 240 may provide forecasting and scheduling based on a complete end-to-end turn-around for completing all steps of a task. For example, in the back office, it is common for a given work item to pass through many steps, often involving many people. While each step may have its own service level target, this does not account for the complete end-to-end turn-around time for completing all steps. In particular, while the forecast for a step in the process can be done by traditional means, the forecast for subsequent steps is dependent on both the forecast and the schedule of previous steps. Also, an employee can work on more than one step, thus solving the forecasting and scheduling problem cannot be done linearly (i.e., one cannot forecast and schedule for step one, then move on to step two, without having to come back to step one again).

To provide for the above, in some implementations, each step of the workflow may be represented by a queue. The queues may be linked through VCT Queue Configuration chaining. This chaining is what Longest-Queue-First (LQF) relies on for relationship management. As such, only queues that had chains defined would take part in the LQF process. In addition, work is not allowed to flow backwards, repeat a step, or skip steps in this phase.

LQF-related parameters in VCT Queue Configuration include:

Source event—the event on the current source queue that triggers the chain

Target event—the event that will be created when the chain is triggered

Target Queue—the queue that will receive the target event when the chain is triggered Proportion—the size of the target effect bundle size—the number of source events that have to be received before the chain is fired lag—the time delta between when the source event or bundle is received and the target event is created The queue at the top of a VCT chain tree begins with an initial forecast. Each queue has its own Service Goal. Because each queue represents one touch in a multi step process, these per step goals are may be called "touch goals." Scheduling may begin with LQF options being selected, such as a LQF convergence delta threshold, LQF cycle count threshold, and a LQF processing time threshold. These thresholds govern how the LQF logic determines when it should exit a convergence loop. A delta threshold is the rate of change between the prior and current cycle's convergence metric. A convergence score is simply the current cycle's convergence metric. A cycle count limits how many times the LQF calculates full cycles, and processing time limits how long the LQF process can run. The last two parameters prevent the LQF logic from continuing endlessly if the process "orbits" convergence rather than reaches it.

Initial values for convergence threshold parameters may halt convergence processing when one of the following is true: the rate of change of the internal convergence score between successive calculations is <10%, the process has completed 30 iterations, or the process has run for more than 60 minutes.

Figure 9:
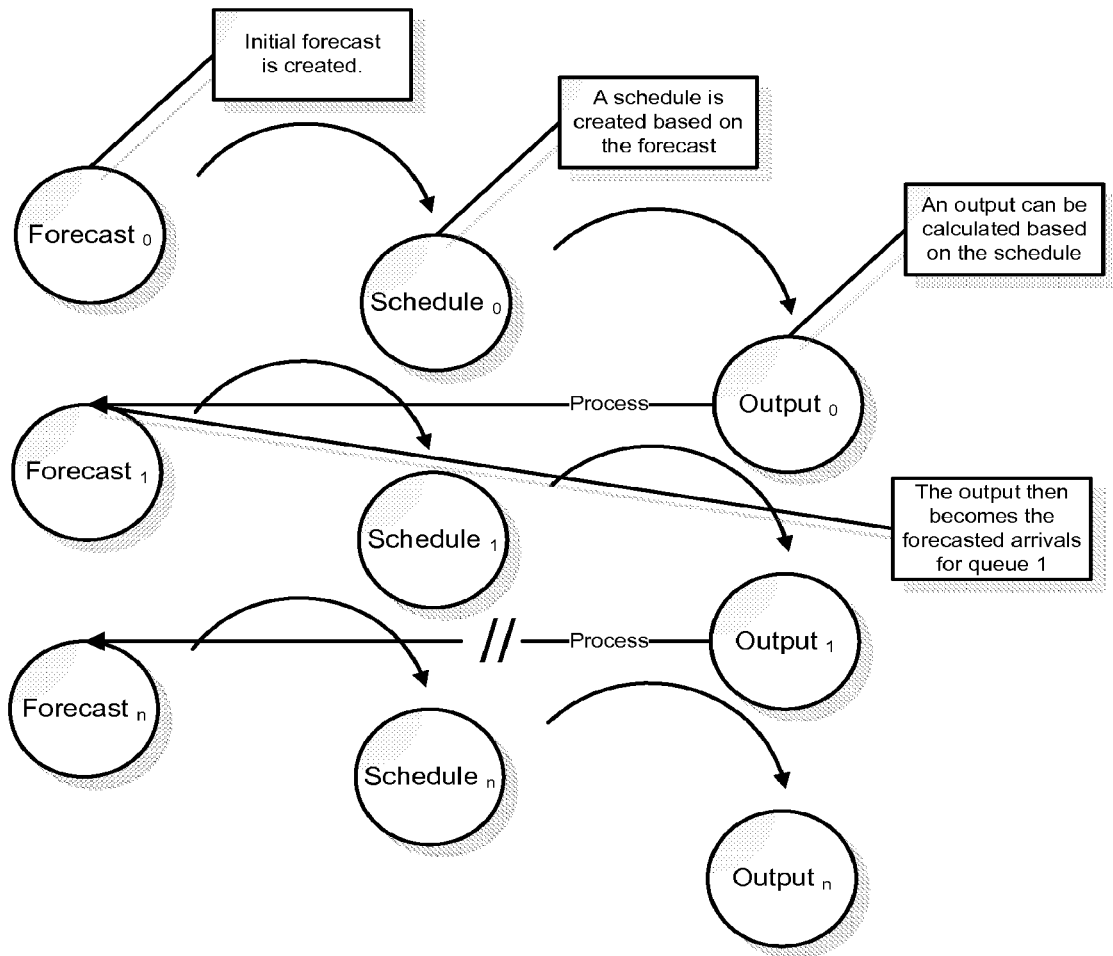
FIG. 9 illustrates an iterative process for forecasting and scheduling.

As shown in FIG. 9, an some implementations, the LQF process includes multiple scheduling and forecasting runs. Each scheduling/forecasting pair may be called a tier (e.g., the tier represents the level where the VCT chain(s) currently being used to forecast are located). A complete set of tiers from top to bottom is considered a cycle. A convergence score is generated at the end of each cycle. At least two cycles are required before the LQF logic will consider halting.

As shown in FIG. 9, this problem may be resolved through an iterative process. The optimization is done per individual task, and each task, upon being optimized, can publish a forecast of its output rate. This output rate can then be used in the following iteration for the optimization of a different queue and a different task. After several iterations, the process may converge. The convergence score or metric for a given cycle is a measure of the total volatility of the current forecasts when compared to their respective forecasts during the previous cycle. To calculate the convergence score, deltas are calculated at the interval level for each forecast. The deltas are then squared and summed.

Figure 10:
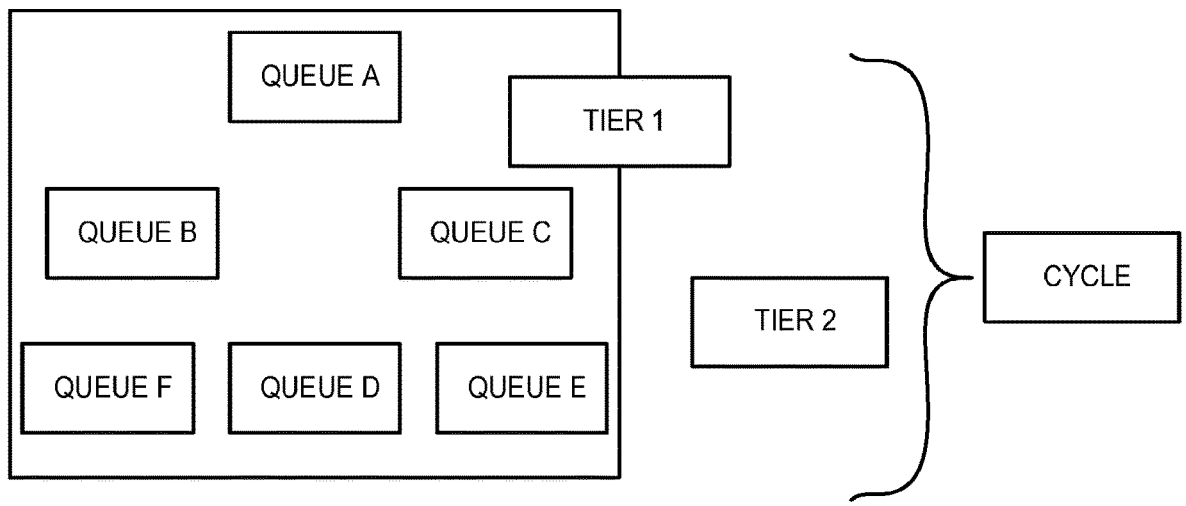
FIG. 10 illustrates target queues within tiers that are processed as part of the forecasting and scheduling of FIG. 9.
Figure 11:
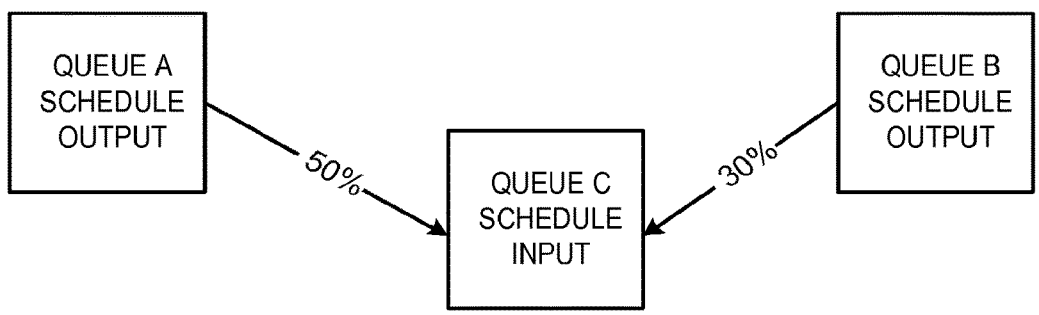
FIG. 11 illustrates chain proportion values that are used to modify the target queues of FIG. 10.

As shown in FIGS. 10-11, during forecast generation for a particular tier, each target queue is processed. For each target queue, all parent queues are identified. Production rates by interval are calculated for each parent queue based on interval (arrival-interval backlog delta). Production rates are then modified by the appropriate chain proportion value and the target queue's forecast is calculated.

In accordance with some implementations, the following VCT events may be considered when creating target queue forecasts: target event is an arrival, and target event is a check-in and target queue is Work Completed (arrival is implied). Additionally, Arrival→Arrival chains can be modeled without a subsequent cycle as they depend on the first queues arrival, but not directly on the schedule. Check Out→Arrival chains are computed similarly to Check In→Arrival chains, with the exception that they have an additional negative lag equal to the Handle Time of the Source Queue.

A sample flow based on three queues chained in series (i.e., two tiers) may be as follows:

1. LQF process initiated.
2. Schedule generated (for Q1 based on prerequisite Q1 forecast).
3. Forecast generated for Q2 based on Q1 output (interval arrivals-backlog delta).
4. Schedule generated (Tier 1 completed).
5. Forecast generated for Q3 based on Q2 output (interval arrivals-backlog delta), as well as Q2 from Q1.
6. Schedule generated (Tier 2 completed).
7. Cycle completed. Convergence metric calculated. Continue? Yes. Go to step 3
8. LQF process completed.

During LQF processing, multiple scheduling passes may be executed. Upon completion by the scheduler 204, users may receive a single configuration dialog and a single post-scheduling agenda dialog in a user interface. During scheduling, the current cycle, tier and most recent convergence delta may be displayed. Thus, the scheduler 240 can provide for forecasting and scheduling for completion of all steps associated with a business task.

Alternatively or additionally, In some implementations, the scheduler 240 may also provide for so-called "time banking," which is also to referred to as "annualized hours. Companies having contact centers often have full time salaried employees, but have large seasonal variations in their incoming volume. The incoming volume is work, such as call volume and e-mails in a contact center, or insurance claims in a back office. To meet the variable load, instead of using overtime, part time employees, etc., companies may set up an agreement with their full time agents to work longer hours during busy times of the year, and fewer hours during slow times of year, while ensuring that through the course of the year that employees work the same number of hours that they would have worked if they stuck to a normal set number of hours each week. The balancing of the hours worked may be over the entire year or based on a shorter period of time. Agents "bank" hours when they work more than the normal amount of time, and detract from the 'bank' when they work less than the normal number of hours.

In accordance with some implementations, a time banking algorithm provides for hires, attrition, training/transfers, and vacation for the entire time bank. A example high-level work flow is as follows: creating/optimizing a plan, scheduling the plan and tracking the plan. The plan may contain a set of weekly target hours over a period of, e.g., 6 weeks to a year, that take into consideration the seasonal variations in incoming volume. Shift assignments may be calculated for each employee. The shift assignments adhere to established minimum and maximum weekly hours and meet the incoming volume forecasted in the previous steps plan. Visual displays of the plan target hours, scheduled hours, and worked hours may be displayed to the user through graphical displays and statistical reports. These displays assist the user in evaluating adherence to the original time bank Plan.

Figure 12:
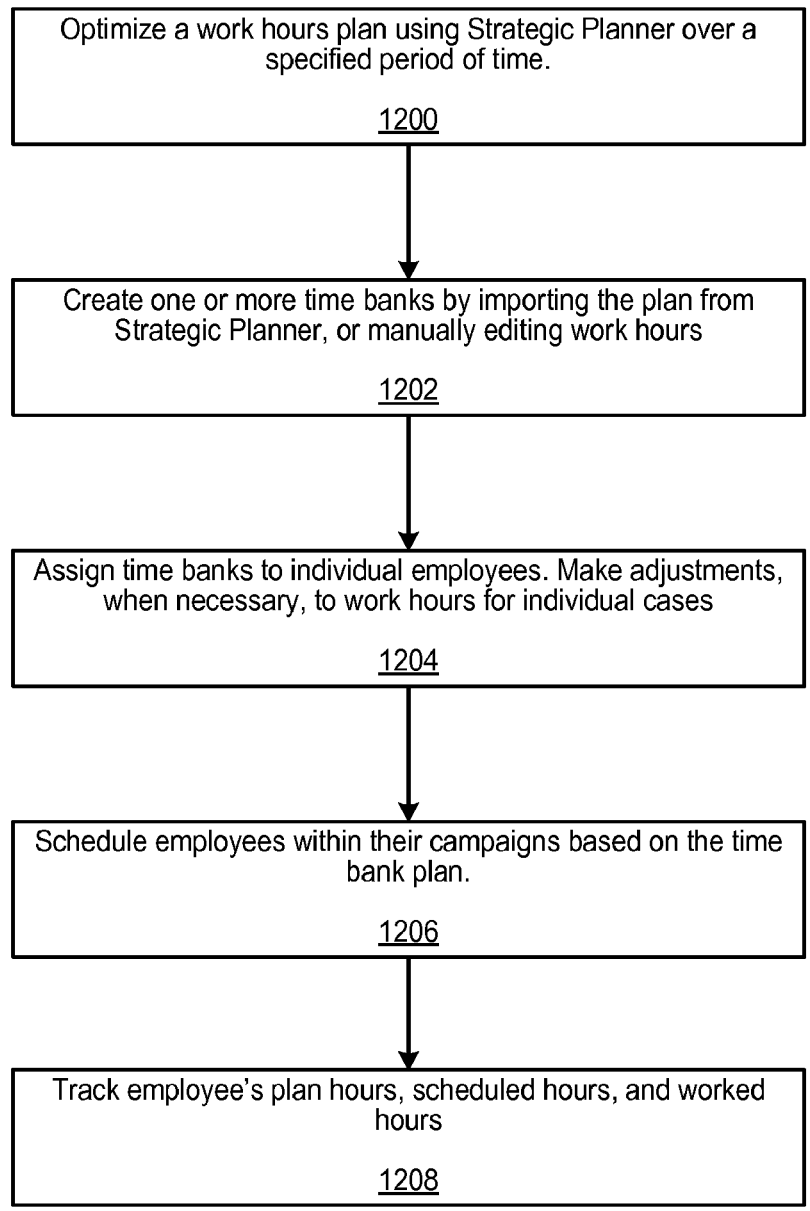
FIG. 12 illustrates a flowchart of a method for providing time banking.

FIG. 12 illustrates processes to create, schedule and track to a time bank plan. A work hours plan for a period of time is optimized using a strategic planner (1200). A strategic planner application may create a long-range plan, such as 6 months, 1 year, or 2 years, by predicting future conditions, the types of ongoing actions needed to meet those conditions, and the costs and relative effectiveness of the ongoing actions. The strategic planner may permit the user to optimize their projected strategic workforce plan over multiple parameters. Optimization can be based on the following parameters:

Hours per week
Vacation hours per week
Overtime hours
Retraining
Layoff plans
Hiring The user may enter work rule constraints for the staffing profiles. The parameters may be minimum hours per week–the minimum number of hours a profile should work; maximum hours per week–the maximum number of hours a profile should work; maximum overtime hours per week–the maximum number of overtime hours; paid hours per scenario–the exact number of hours a profile should work for the entire scenario; and paid vacation hours per scenario–the exact number of vacation hours a profile should have for the entire scenario (e.g., a default may be 160 hours).

The user may next create a forecast of the expected work flow, desired service levels, known information regarding shrinkage, attrition, starting work force levels and known hires. The user may also set an optimization parameter "Hours per week" or "Hours per month" (this depends on if this is a weekly or monthly scenario), but may also should optimize over as many parameters as possible to get the most optimized time bank plan. Once generated the user can view the hours for each individual week/month for each staffing profile, as well as hours in training, number of hires, how many are transferring in or out, expected attrition, vacation hours, overtime hours, and layoffs for each time period.

A next step, is to create time bank (1202). The user may export the staffing weekly/monthly hours data to be available to the scheduler 240. Exported data may have a unique name that includes the name of the staffing profile and the start and end date of the portion of data being exported. Exported data may be limited to be between 6 weeks and 1 year, which may be a time bank maximum.

The scheduler 240 provides an interface for the user to enter parameters such as employees, skill, and work rules. The scheduler 240 allows schedulers to create campaigns with scheduling periods of, e.g., 1 to 6 weeks with specific employees assigned, forecasted workloads, and desired service goals. A scheduling algorithm uses all of this input to generate a schedule for the employees that both meet their work rules and their incoming volumes and goals.

The scheduler 240 also includes a time bank planning mechanism. The scheduler 240 may provide provides a series of interfaces that assists the user in entering and scheduling to the time bank plan. A first interface may be used in initializing a time bank. A user may initialize a time bank by selecting to induct the strategic planner staff profile of work hours, by importing a time bank file, by specifying an overall yearly target goal to be distributed, or by copying and pasting an existing time bank. Once initialized the user can edit, lock and reload values, to finalize their time bank plan.

The user can initialize or update an existing plan by selecting "Use Strategic Planner Plan" and then selecting one of the plans that appears in the drop down list. The list will contain all strategic plans that overlap the time bank's start and end. The user can update specific portions of the time bank plan by exporting from Strategic Planner specific date ranges, and then loading them into that portion of the time bank. In addition, selected base period target values may be locked, so when loading planner it will only load data into those base periods that are not locked.

The user can initialize or update a time bank plan by entering a single value to be distributed across the base periods of the time bank. On initialization, this value is distributed evenly with a carryover algorithm to limit the weekly values to 15 minute granularity. On update, this value is distributed proportionately based on the existing values. If the user determines that the maximum hours an employee can work per year is changed, and the user does not want to adjust everything, the update will be proportionately spread across the year.

The time bank may be displayed showing all the individual work hours and the rolled up total number of values. The forecasting and scheduling may provide the user with a selection of tools for viewing/modifying their data. Intermediate periods may be defined that optionally combine base periods into a single rolled up value. This allows the user to visualize/modify workers hours based on intermediate periods that reflect their company's workload periods such as Winter, Spring, Summer Fall, or a release cycle. The user has the ability to lock individual cells. When locked, the data will appear in a grayed cell and the user can not edit the value without first unlocking. A locked cell is not updated. When the time bank plans are complete and ready for assignment to individual employees, they are assigned. Employees can have as many time banks assigned to them as needed, but they may not overlap.

After the user has assigned the time banks, they are ready to be applied to the user's scheduling (1204). The user creates a campaign that is between, e.g., 1 to 6 weeks long and assigns a set of employees (1206). The user then creates a forecast to reflect the work load expected for the period, and sets desired service level goals. The scheduler 240 will work to create a set of shift assignments to meet these forecasted values and goals, with the added constraint of trying to meet the time bank weekly values within this scheduling period. The scheduler 240 is also aware of any overage or underage of the shift assignment hours to date, and will try to catch up or subtract to bring the time bank total closer to the expected total for the end of the scheduling period. If, after scheduling, the employee is over or under his hours for the current period for the bank to date, a message may be shown in both the scheduler warning tree and any conflicts. If the time bank period for an Employee does not fully intersect the scheduling period that is being scheduled, a pre-scheduler warning may be shown when an Assignment Rule period does not correspond to the scheduling period.

Time banks are general and may be applied to a group of employees. There may be scenarios where adjustments need to be made for specific employees, for example, a new employee starting mid-time bank, or an employee needing to take weeks of unpaid leave. In these situations, the user will go to the campaign, select the individual employee and request a specific number of hours be added or subtracted to the employee's time bank on that specific date. If the employee had to take 3 weeks of unpaid leave where he was expected to work a total of 200 hours, the adjustment would be added to the first week after the 3 weeks of unpaid leave. If the employee was new and starting half way through the year, the user may want to put an adjustment at his start date to account for the hours expected for the months prior to his hiring or transfer.

The user will be able to track the target hours, assigned paid hours, and the current balance from an employee page (1208). By selecting the employee and the time bank tab, these values will be displayed for the base periods, intermediate period, and time banks for all scheduled weeks. Color-coded cells may be used to reflect balances in the positive (e.g., green) or negative (e.g., red), for an easy overview understanding of the status of the time bank plan. When a shift assignment spans across a base period boundary, the whole shift length will be counted towards that base period if its start date is in the base period; otherwise, it will not be included at all for this base period.

Agents and managers may be able to view and track the employee's current time bank information through a web interface. The agent and manager web views show different over/under hours then the forecasting and scheduling view. Specifically, forecasting and scheduling shows over/under hours relative to the plan while the web pages show over/under hours relative to the pro-rated yearly/period total. For example, if the time bank target is 2000 hours a year and the weekly targets say that the employee has an intermediate goal of 1100 hours for the first half of the year. So far, the employee is scheduled perfectly to his plan, so forecasting and scheduling would show that the employee is working 1100 out of 1100 hours (0 over/under).

In the web interface, the scheduler 240 would use 1000 hours as the goal, so the agents and managers would see that the employee is working 1100 out of 1000 hours (100 hours over). This is important because the individual employee does not care that he/she is tracking to the plan, just that there are, e.g., 100 hours "in the bank" that he/she will be scheduled off for before the end of the year.

The following data may be shown in the web interface:

Period: Start Date and End Date of the agent's current time bank template.

Target Hours: The total number of hours required to be worked by this agent in the entire time bank Period.

Target Hours (up to date): The pro-rated number of hours required to be worked by this agent in the period from the beginning of the time bank, to the "up to date", which is the end of the last fully-published schedule period which starts within the time bank period. The "up to date" will be shown in parentheses in the title of the time bank section. The way the pro-rated target hours is determined is as follows:

tbStartDate=Time Bank start date.
tbEndDate=Time Bank end date.
upToDate=The end of the last fully-published schedule period which starts within the time bank period.
tbDuration=The number of milliseconds between tbStartDate and tbEndDate.
prDuration=The number of milliseconds between tbStartDate and upToDate.
ratio=prDuration/tbDuration
Target Hours up to date=Target Hours*ratio Scheduled Hours (up to date): The number of scheduled hours for this agent in the period from the beginning of the time bank, to the "up to date", which is the end of the last fully-published schedule period which starts within the time bank period.

Adjustments: Any schedule adjustments for this agent between tbStartDate and upToDate Balance: (Scheduled Hours up to date+Adjustments)−Target Hours up to date If the agent is currently assigned a Time Bank, then he/she will see the following fields on the Agent's Summary screen: Target hours, target hours to date, scheduled hours, adjustments, and balance. For example, an agent's current time bank may be defined from 1/1/09 to 1/1/10, and it has a target of 1000 hours and 0 minutes. The agent's last published schedule period ends on 4/17/09, so the other columns in the table only go up to this date. The "Target Hours (up to 4/17/09)" column is the pro-rated target from 1/1/09 to 4/17/09. The "Scheduled Hours (up to 4/17/09)" column is the number of scheduled hours from 1/1/09 to 4/17/09. The "Adjusted Hours" column is the sum of the scheduled hours and any adjustments made that are applied to base periods between 1/1/09 to 4/17/09. The "Balance" column is the pro-rated target hours minus the adjusted hours. All values are displayed in the HOURS:MINUTES format.

Managers will see Time Bank data on an employee time summary page. For each agent, the Time Bank table will appear if the agent is currently assigned to a time bank. Each row in the Time Bank table will contain the current time bank data for a particular agent. The manager will see the current time bank name in a new column. The manager's "Adjustments" column will contain an icon that brings up the "Adjustments" dialog for that employee, where the manager can add/edit schedule adjustments for that employee, just like in the forecasting and scheduling. The manager will also have the ability to import a set of adjustment specifying employee, date of adjustment, and the adjustment value. The web client will be able to filter their employee displays by a range of time bank balances. This will allow the manager to easily see how many employees he may have that may have time bank balance concerns.

The web client may provide a time bank report that includes a "Staffing Reports" topic that has a report called "Employee Time Banks." The report is similar to the manager's Time Bank screen in the web interface described earlier, however, the report will show both scheduled and actual hours. In addition, the report output will contain one section per employee, and each section will contain a row for each of the employee's time banks that fall in the specified date range. An employee's time bank rows will be sorted by time bank start date. Finally, the employee sections will be sorted by employee name.

Thus, as described above, the present disclosure provides for a fully integrated time banking integration. Users will be able to create their time bank plan using optimization algorithms based on all employee factors, from work hours, new hires, attrition, as well as forecasted incoming volume. It provides extensive tools to modify or reuse the time bank plan. It incorporates the time bank constraints into an advanced scheduling system that takes into consideration not only the time bank plan, but also any manual adjustments made during the time bank period, and automatic adjustments for current underage or overage of an employee's time bank hours. In addition, it provides integrated user displays and reports that allow the agent or manager to monitor the time bank balance and make adjustments. This invention is not a side report or spreadsheet of some forecasting software, it is a fully integrated key component of the whole WFO solution FIG. 13 is a hardware block diagram of a general-purpose computer 1300 which can be used to implement various embodiments of systems and methods for automatic scheduling of a workforce. 1300 contains a number of components that are well known in the art of contact center software, including a processor 1310, a network interface 1320, memory 1330, and storage device 1340. Examples of storage device 1340 include, for example, a hard disk, flash RAM, flash ROM, and EEPROM. These components are coupled via a bus 1350. Memory 1330 contains instructions which, when executed by the processor 1310, implement systems and methods for automatic scheduling of a workforce, such as the processes depicted in the diagrams of FIGS. 1-12. Omitted from FIG. 13 are a number of conventional components that are unnecessary to explain the operation of 1310.

The systems and methods for automatic scheduling of a workforce can be implemented in software, hardware, or a combination thereof. In some embodiments, the system and/or method is implemented in software that is stored in a memory and that is executed by a suitable microprocessor ($\mu$P) situated in a computing device. However, the systems and methods can be embodied in any computer-readable medium for use by or in connection with an instruction execution system, apparatus, or device. Such instruction execution systems include any computer-based system, processor-containing system, or other system that can fetch and execute the instructions from the instruction execution system. In the context of this disclosure, a "computer-readable medium" can be any means that can contain, store, communicate, propagate, or transport the program for use by, or in connection with, the instruction execution system. The computer readable medium can be, for example but not limited to, a system or propagation medium that is based on electronic, magnetic, optical, electromagnetic, infrared, or semiconductor technology.

Specific examples of a computer-readable medium using electronic technology would include (but are not limited to) the following: an electrical connection (electronic) having one or more wires; a random access memory (RAM); a read-only memory (ROM); an erasable programmable read-only memory (EPROM or Flash memory). A specific example using magnetic technology includes (but is not limited to) a portable computer diskette. Specific examples using optical technology include (but are not limited to): an optical fiber; and a portable compact disk read-only memory (CD-ROM). In addition, the functionality could be implemented in logic embodied in hardware or software-configured media.

Any process descriptions or blocks in flowcharts should be understood as representing modules, segments, or portions of code that include one or more executable instructions for implementing specific logical functions or steps in the process. As would be understood by those of ordinary skill in the art of the software development, alternate embodiments are also included within the scope of the disclosure. In these alternate embodiments, functions may be executed out of order from that shown or discussed, including substantially concurrently or in reverse order, depending on the functionality involved.

This description has been presented for purposes of illustration and description. It is not intended to be exhaustive or to limit the disclosure to the precise forms disclosed. Obvious modifications or variations are possible in light of the above teachings. The embodiments discussed, however, were chosen to illustrate the principles of the disclosure, and its practical application. The disclosure is thus intended to enable one of ordinary skill in the art to use the disclosure, in various embodiments and with various modifications, as are suited to the particular use contemplated. All such modifications and variation are within the scope of this disclosure, as determined by the appended claims when interpreted in accordance with the breadth to which they are fairly and legally entitled.

What is claimed:

1. A method for queue hopping, comprising:

receiving, at a processor, a shift-variable length activity template association, the shift-variable length activity template association including a shift and a variable length activity template describing a variable length activity related to at least one queue performed during a shift, the variable length activity template being a data structure including a plurality of fields, the plurality of fields including the variable length activity, a range of start times, a variable length for the at least one activity, and the at least one related queue, the at least one related queue that has varying incoming volumes of work at different times during the shift;

receiving, by the processor, at least one worker identification associated with the shift for the shift-variable length activity template association;

creating at least one schedulable object for each worker identification received with the at least one shift-variable length activity template association, the schedulable object being a data structure including fields for the plurality of fields from the variable length activity template, the associated shift, and the associated at least one worker identification;

scheduling, with the processor, a plurality of the created schedulable objects using heuristic searches in accordance with a workload forecast and schedule constraints;

adjusting, with the processor, a scheduled time for the schedulable object within the shift to evaluate combinations of scheduled times for the schedulable object by binding the schedulable object to a respective period in the shift;

identifying, by the processor, schedulable objects that are in excess of a minimum number of schedulable objects for the shift, wherein the minimum number of schedulable objects for the shift is a minimum value of the variable length field of the data structure associated with the variable length activity template for the schedulable object;

for the identified excess schedulable objects performing, by the processor, an additional binding adding a no_binding indication to the schedulable object;

identifying, by the processor, at least one queue experiencing a backlog and binding at least a portion of the excess schedulable objects to a respective time period in the shift for the at least one queue with the backlog; and directing, by the processor, output from the queue to the at least one worker identification in accordance with the scheduling and binding.

2. The method of claim 1, wherein the heuristic searches comprise one of a quick search, chronological search, activity oriented search and a swap search.

3. The method of claim 2, wherein the quick search comprises:

creating, for each shift-variable length activity template associations, a maximum count of schedulable objects, where each schedulable object contains a list of possibilities consisting of every start-time/activity pair given a start time window defined in the variable length activity template, a shift length, a list of flexible activities defined in the at least one shift-variable length activity template associations, and skills of a worker identification;

ordering the schedulable objects such that non-required objects are first; and scheduling for each worker identification using an existing local search and scoring, to optimize work rules and service goal scores.

4. The method of claim 2, wherein the chronological search comprises:

selecting a non-required schedulable object;

filtering a list of possibilities for that schedulable object such that it only contains a start chronologically ordered start time;

scheduling using an existing local search and scoring to optimize work rules and service goal scores; and if an optional schedulable object is bound, replacing it with a required schedulable object.

5. The method of claim 2, wherein the activity oriented search comprises: creating a list of possible variable length activity orderings; and for each ordering, each variable length activity in the ordering and non-required schedulable object, filtering the list of possible variable length activity orderings for that schedulable object such that it only contains the variable length activity in the ordering;

scheduling using an existing local search and scoring to optimize work rules and service goal scores; and if an optional schedulable object is bound, replacing it with a required schedulable object.

6. The method of claim 2, wherein the swap search comprises:

swapping two activity blocks where an activity of a first block is not the same as an activity of a second block and worker identifications associated with the first block and the second block are the same; and comparing a performance improvement based on the swapping.

7. The method of claim 1, further comprising determining a score that represents one of plural alternatives, where the alternatives include scheduling to achieve service level on as many queues as possible, scheduling activities on the queues that have the most activities, and scheduling activities proportionately to a workload on each queue.

8. A method for queue hopping, comprising:

receiving, at a processor, a shift-variable length activity template association, the shift-variable length activity template association including a shift and a variable length activity template describing a variable length activity related to at least one queue performed during a shift, the variable length activity template being a data structure including a plurality of fields, the plurality of fields including the variable length activity, a range of start times, a variable length for the at least one variable length activity, and the at least one related queue;

receiving, by the processor, an association between the shift-variable length activity template association and at least one worker identification;

creating at least one schedulable object for each worker identification received with the at least one shift-variable length activity template association, the schedulable object being a data structure including fields for the plurality of fields from the variable length activity template, the associated shift, and the associated at least one worker identification defining, by the processor, a time bank of weekly target hours for the at least one worker identification over a predetermined period; and scheduling, by the processor, a plurality of the created schedulable objects associated with the at least one worker identification in accordance with a workload forecast, schedule constraints and the time bank;

adjusting, with the processor, a scheduled time for the schedulable object within the shift to evaluate combinations of scheduled times for the schedulable object by binding the schedulable object to a respective period in the shift;

identifying, by the processor, schedulable objects that are in excess of a minimum number of schedulable objects for a respective period in the shift;

for the identified excess schedulable objects, performing, by the processor, an additional binding adding a no_binding indication to the schedulable object;

identifying, by the processor, at least one queue experiencing a backlog and binding at least a portion of the excess schedulable objects to the at least one queue with the backlog; and directing, by the processor, output of the schedulable objects to the at least one worker identification in accordance with the scheduling and binding.

9. The method of claim 8, further comprising:

defining plural time banks for the at least one worker identification; and assigning one of the time banks to the at least one worker identification in accordance with the workload forecast.

10. The method of claim 8, further comprising scheduling the at least one worker identification within a campaign having a duration of the predetermined period.

11. The method of claim 10, further comprising tracking hours worked by the at least one worker identification during the campaign.

12. The method of claim 8, further comprising projecting the workload forecast in accordance with an hours per week worked by employees, vacation hours per week taken by employees, overtime hours, retraining time, layoff plans and hiring plans.

13. The method of claim 8, further comprising defining intermediate periods within the time bank to reflect workload forecasts having a duration less than the predetermined period.

14. The method of claim 13, wherein the duration is associated with a seasonal adjustment or product release.

15. A method for queue hopping, comprising:

receiving, at a processor, a shift-variable length activity template association, the shift-variable length activity template association including a shift and a variable length activity template describing a variable length activity performed during a shift, the variable length activity template being a data structure including a plurality of fields, the plurality of fields including the variable length activity, a range of start times and a variable length for the at least one activity, the at least one variable length activity being associated with a first queue that is based on a second queue;

receiving, by the processor, an association between the at least one shift-variable length activity template association and at least one worker identification;

creating at least one schedulable object for each work identification received with the at least one shift-variable length activity template association, the schedulable object being a data structure including fields for the plurality of fields from the variable length activity template, the associated shift, and the associated at least one worker;

scheduling, with the processor, a plurality of the created schedulable objects in accordance with a workload forecast of the first queue and a schedule of the second queue;

adjusting, with the processor, a scheduled time for the schedulable object within the shift to evaluate combinations of scheduled times for the worker identification associated with the schedulable object by binding the schedulable object to a respective period in the shift;

identifying, by the processor, schedulable objects that are in excess of a minimum number of schedulable objects for a respective period in the shift;

for the identified excess schedulable objects, performing, by the processor, an additional binding adding a no_binding to the schedulable object;

identifying, by the processor, at least one queue experiencing a backlog and binding at least a portion of the excess schedulable objects to the at least one queue with the backlog; and directing the output of the second queue to the at least one worker identification in accordance with the scheduling and binding.

16. The method of claim 15, further comprising iteratively scheduling the plurality of schedulable objects for subsequent queues.

17. The method of claim 16, wherein the first queue and the second queue are defined as a tier, and wherein the subsequent queues are layered in tiers to create a cycle.

18. The method of claim 17, wherein the tiers within the cycle converge to create a score.

19. The method of claim 18, wherein the convergence of the cycle is set in accordance with a cycle delta threshold, a cycle count threshold and a processing time threshold.

20. The method of claim 15, wherein a production rate of the second queue is modified by a chain proportion value when a forecast of the first queue is generated.

* * * * *